US009824454B2

(12) United States Patent
Sato

(10) Patent No.: US 9,824,454 B2
(45) Date of Patent: Nov. 21, 2017

(54) IMAGE PROCESSING METHOD AND IMAGE PROCESSING APPARATUS

(71) Applicant: NEC Corporation, Tokyo (JP)

(72) Inventor: Akari Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 14/757,516

(22) Filed: Dec. 23, 2015

(65) Prior Publication Data

US 2016/0225159 A1    Aug. 4, 2016

(30) Foreign Application Priority Data

Dec. 25, 2014  (JP) ................. 2014-261421
Feb. 17, 2015  (JP) ................. 2015-028340

(51) Int. Cl.
*G06T 7/00* (2017.01)
*G06T 7/11* (2017.01)
*G06T 7/90* (2017.01)
*G06T 7/194* (2017.01)

(52) U.S. Cl.
CPC .............. *G06T 7/0081* (2013.01); *G06T 7/11* (2017.01); *G06T 7/194* (2017.01); *G06T 7/90* (2017.01); *G06T 2207/10016* (2013.01); *G06T 2207/10024* (2013.01)

(58) Field of Classification Search
CPC ......... G06T 2207/10024; G06T 7/0081; G06T 7/11; G06T 7/194; G06T 7/90; G06T 7/00
See application file for complete search history.

(56) References Cited

U.S. PATENT DOCUMENTS

| 5,485,556 | A   | * | 1/1996  | Takagi   | G06T 15/506  |
|           |     |   |         |          | 345/426      |
| 5,572,635 | A   | * | 11/1996 | Takizawa | G06T 15/506  |
|           |     |   |         |          | 345/426      |
| 6,356,646 | B1  | * | 3/2002  | Spencer  | G06K 9/0063  |
|           |     |   |         |          | 348/144      |
| 8,149,268 | B1  | * | 4/2012  | Meyers   | H04N 5/144   |
|           |     |   |         |          | 348/42       |
| 2008/0266554 | A1 | * | 10/2008 | Sekine   | G01J 1/42    |
|           |     |   |         |          | 356/300      |
| 2010/0226570 | A1 | * | 9/2010  | Riley    | G06T 3/4061  |
|           |     |   |         |          | 382/167      |
| 2012/0140988 | A1 | * | 6/2012  | Takahashi | G06K 9/00805 |
|           |     |   |         |          | 382/103      |

(Continued)

FOREIGN PATENT DOCUMENTS

| JP | 6-94450    | 4/1994 |
| JP | 2011-55068 | 3/2011 |
| JP | 2012-57976 | 3/2012 |

OTHER PUBLICATIONS

International Searching Authority Written Opinion dated Dec. 15, 2015, in related Application No. PCT/JP2015/005750.

(Continued)

*Primary Examiner* — Jingge Wu
(74) *Attorney, Agent, or Firm* — Finnegan, Henderson, Farabow, Garrett & Dunner, L.L.P.

(57) ABSTRACT

An image processing apparatus including a memory storing instructions, and at least one processor configured to process the instructions to calculate a solar spectrum using a time at which an input image is captured, and a position at which the input image is captured, calculate an estimated background calculated to be close to a background included in the input image, using the input image and the solar spectrum, and output the estimated background.

15 Claims, 21 Drawing Sheets

(56) References Cited

U.S. PATENT DOCUMENTS

| | | | | |
|---|---|---|---|---|
| 2012/0183213 A1* | 7/2012 | Robles-Kelly | ..... | G06K 9/00362 382/165 |
| 2013/0300850 A1* | 11/2013 | Millikan | .............. | A61B 5/0077 348/77 |
| 2015/0207959 A1* | 7/2015 | Kaneko | .................... | H04N 1/60 348/234 |
| 2015/0379702 A1* | 12/2015 | Ulman | .................. | G06T 7/0002 348/207.1 |

OTHER PUBLICATIONS

E. Kaneko et al., "Daylight Spectrum Model under Weather Conditions from Clear Sky to Cloudy", International Conference on Pattern Recognition (ICPR), pp. 1435-1438, 2012.

R. Cucchiara et al., "Detecting Moving Objects, Ghosts, and Shadows in Video Streams", IEEE Transactions on Pattern Analysis and Machine Intelligence, vol. 25, No. 10, pp. 1337-1342, Oct. 2003.

J. B. Huang et al., "Moving Cast Shadow Detection using Physics-based Features", IEEE Conference on Computer Vision and Pattern Recognition, pp. 2310-2317, 2009.

A. Cavallaro et al., "Shadow-aware object-based video processing", IEEE Proc. Vis. Image Signal Process., vol. 152, No. 4, Aug. 2005.

R. E. Bird et al., "Simple Solar Spectral Model for Direct and Diffuse Irradiance on Horizontal and Tilted Planes at the Earth's Surface for Cloudless Atmospheres", Journal of Climate and Applied Meteorology, vol. 25, No. 1, pp. 87-97, Jan. 1986.

Wikipedia, the free encyclopedia, (https://en.wikipedia.org/wiki/Background_subtraction) for "background subtraction", (searched on the Internet on Dec. 5, 2014).

* cited by examiner

FIG. 4A
FIG. 4B
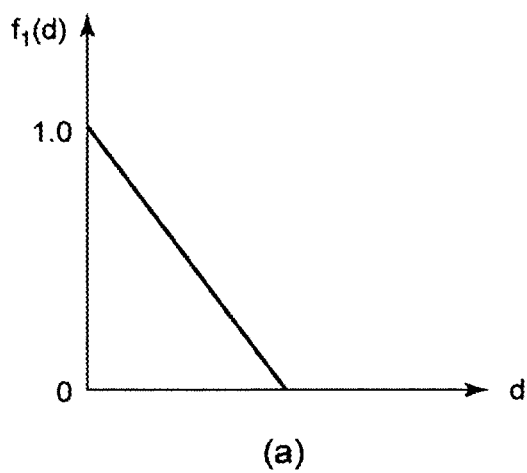
(a)
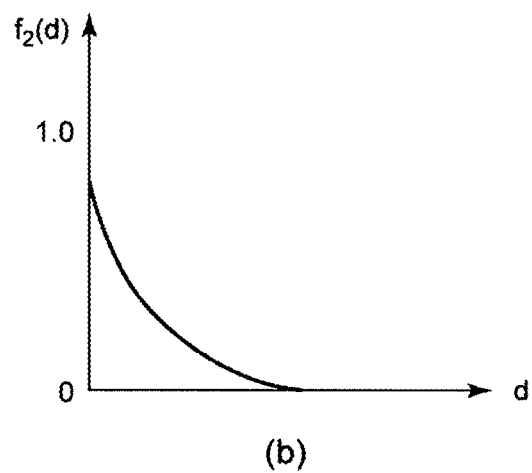
(b)

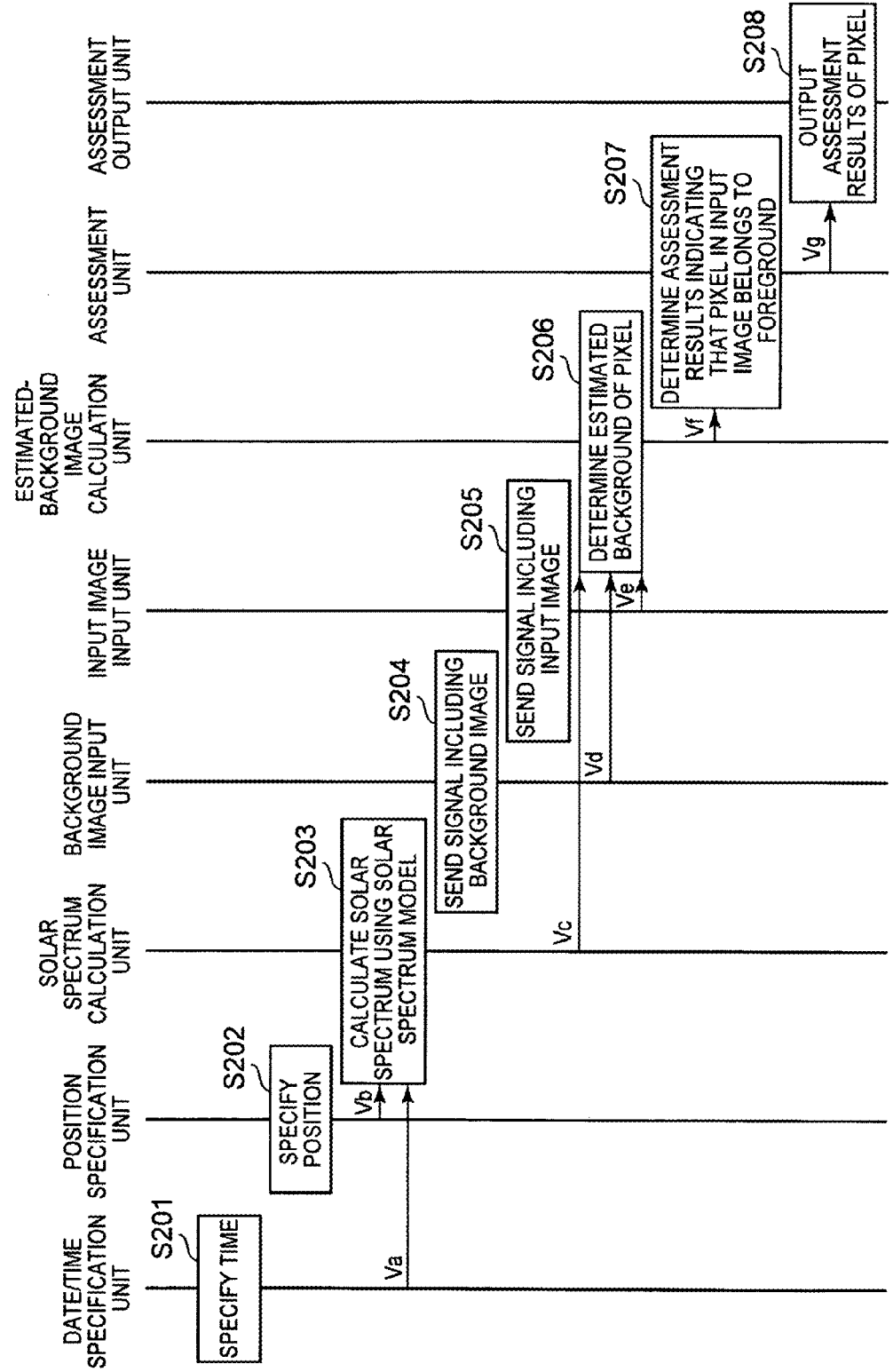

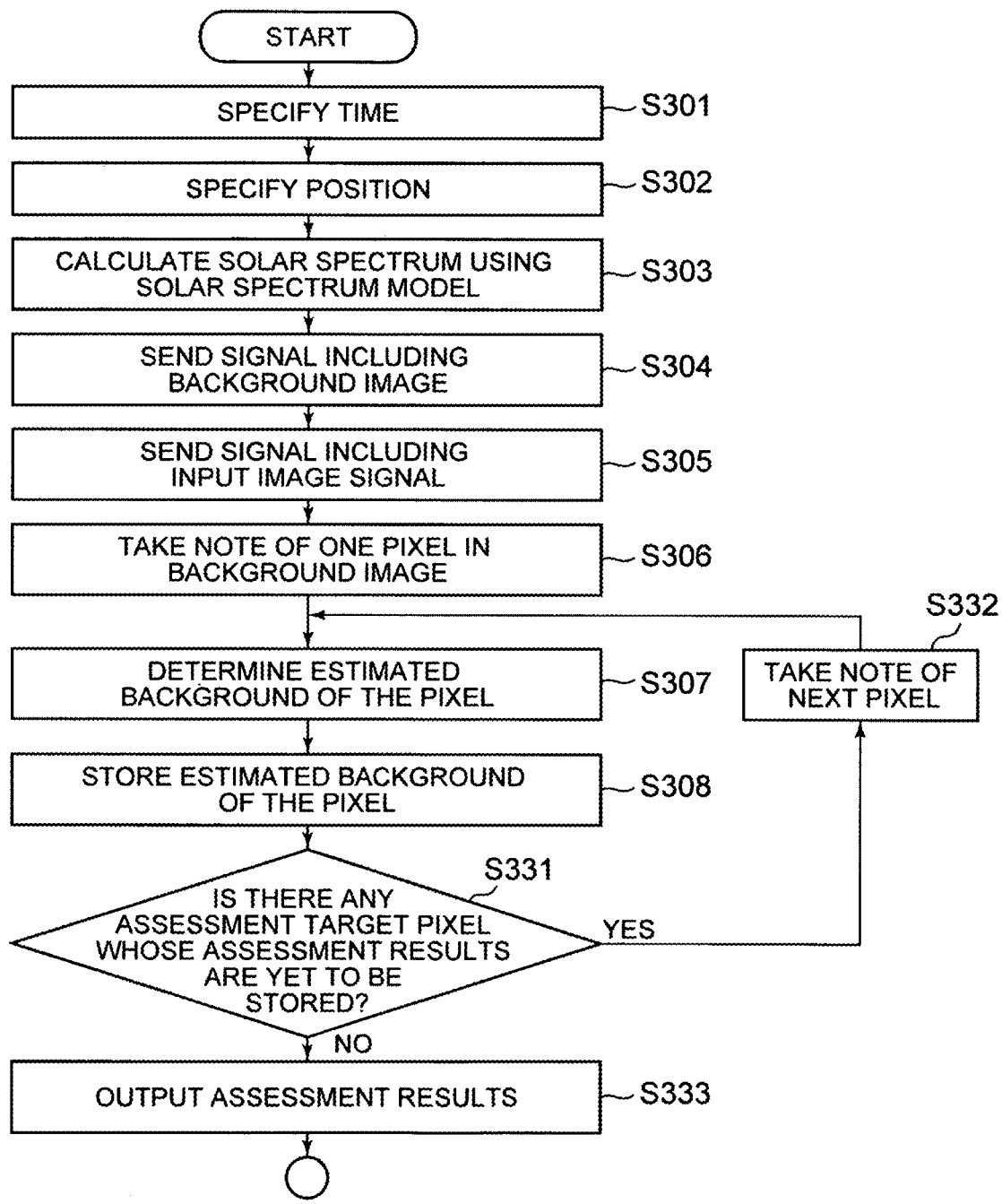

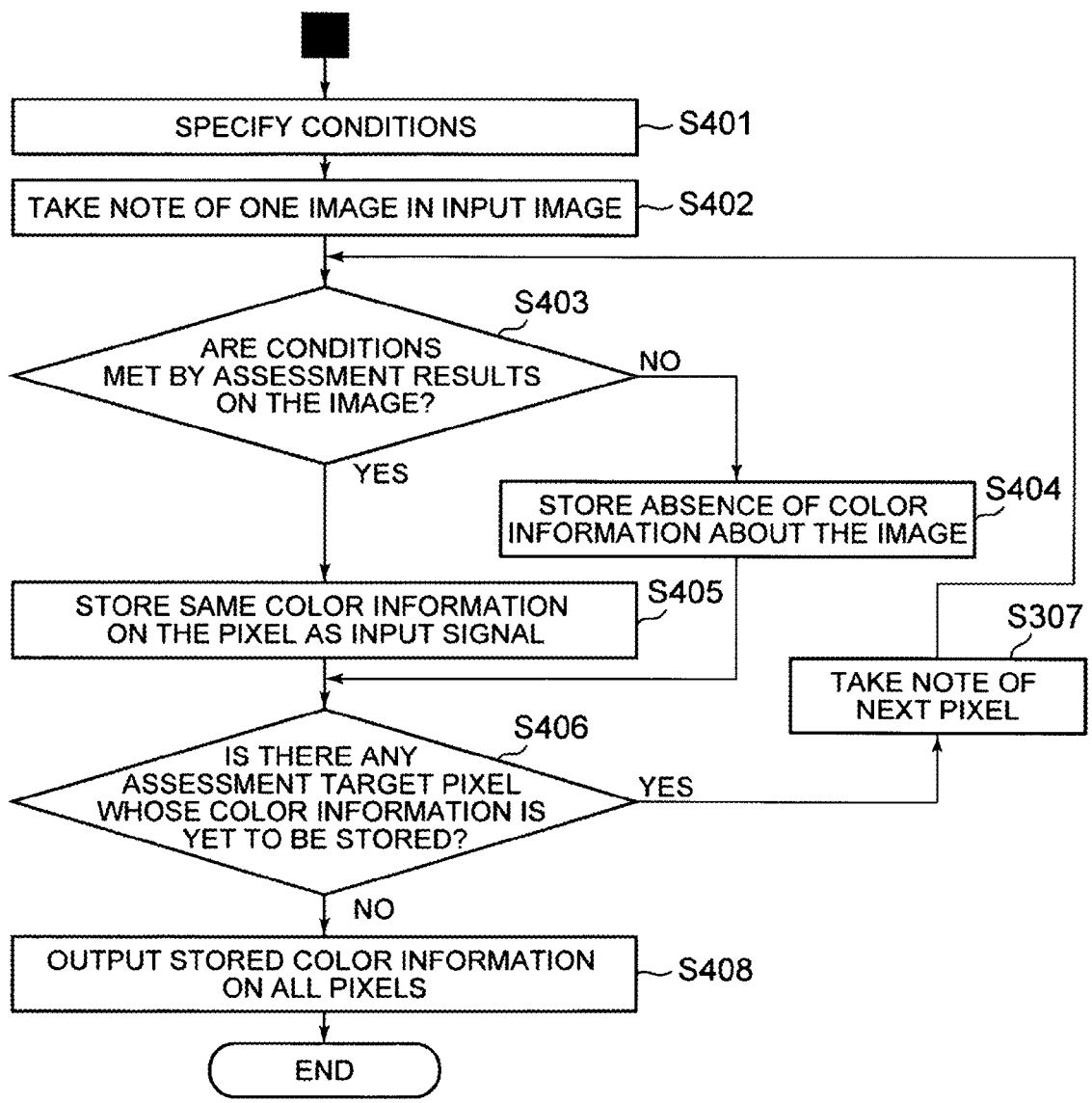

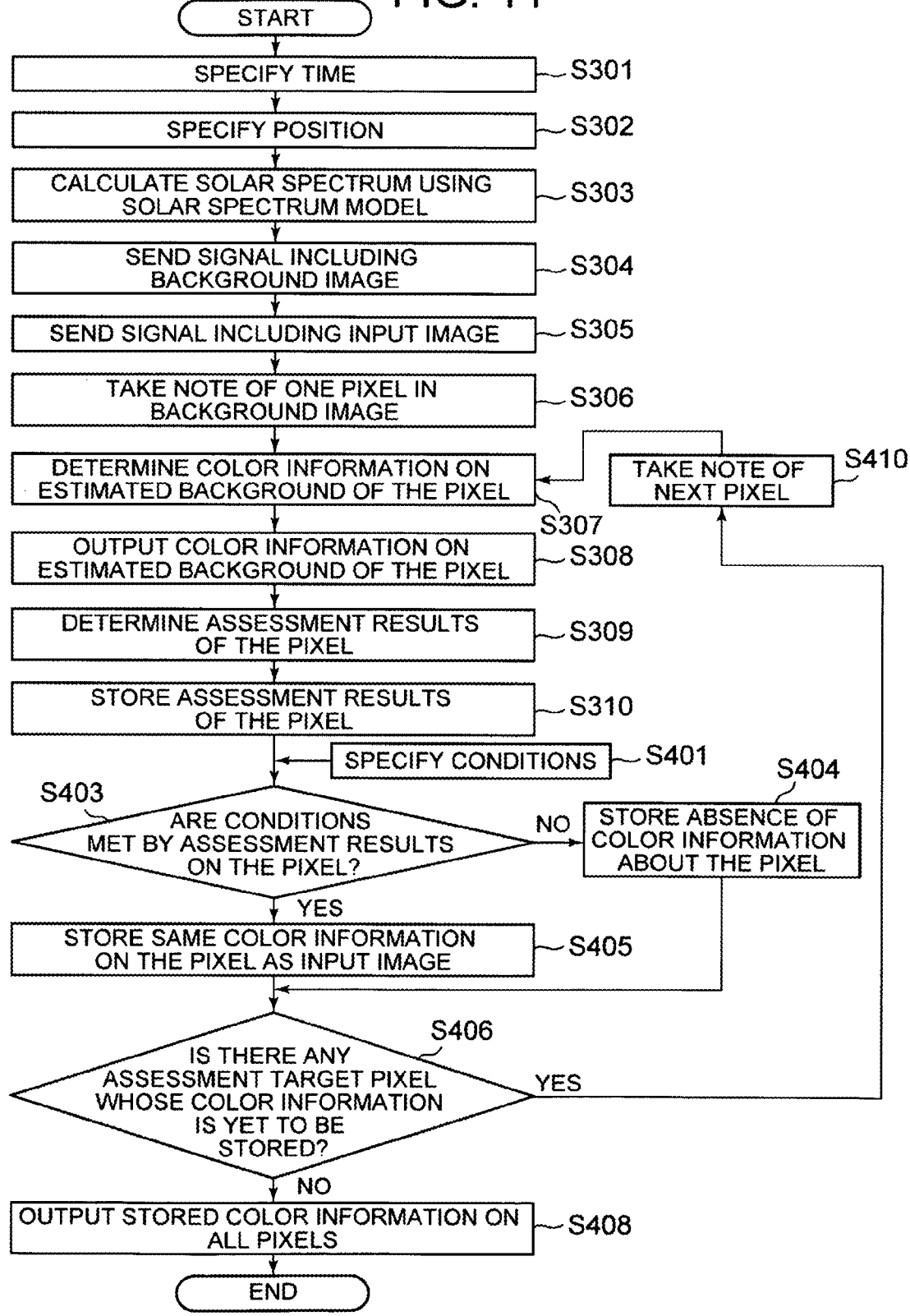

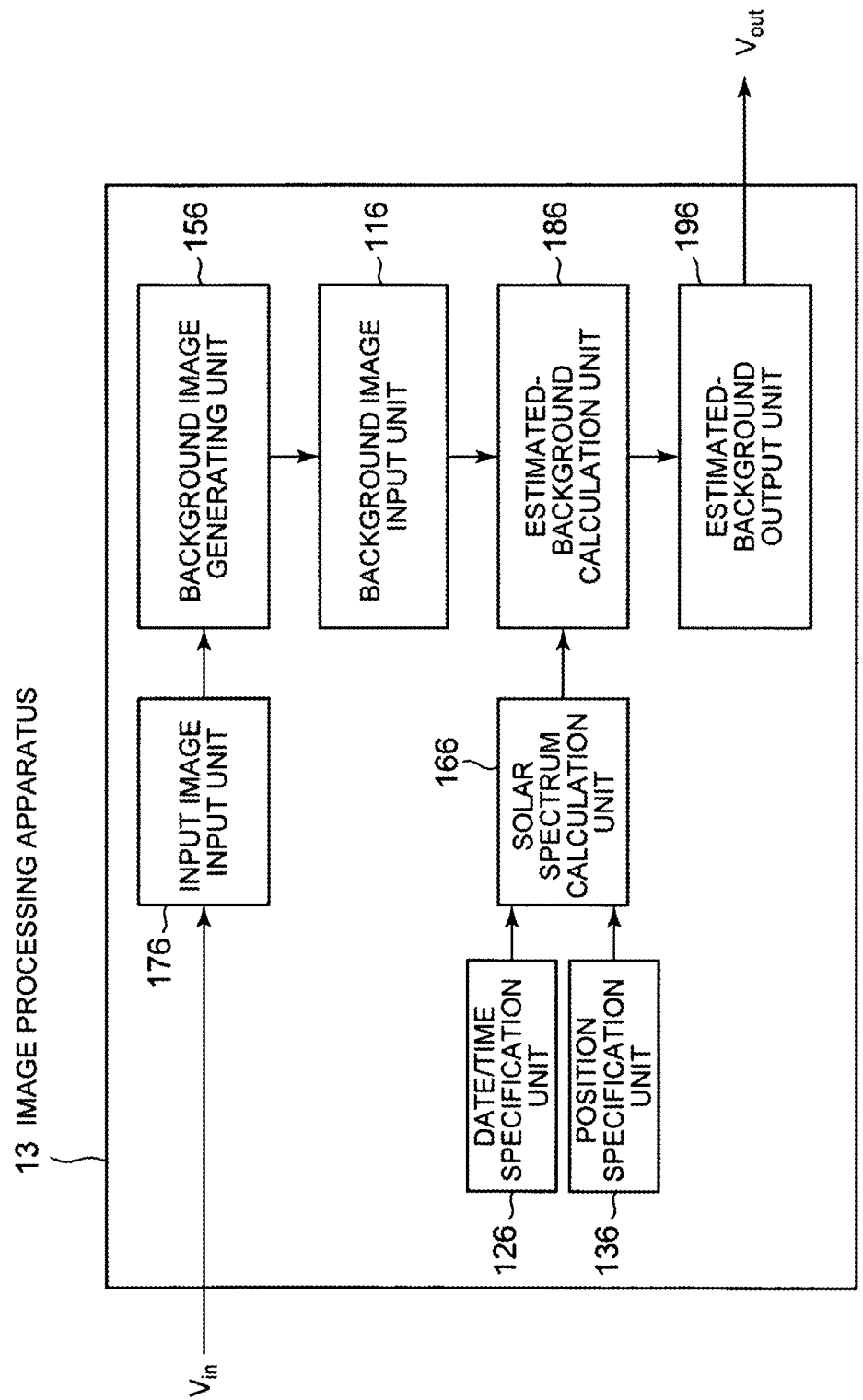

IMAGE PROCESSING METHOD AND IMAGE PROCESSING APPARATUS

CROSS-REFERENCE TO RELATED APPLICATIONS

This application claims priority from Japanese Patent Application No. 2014-261421, filed on Dec. 25, 2014, and Japanese Patent Application No. 2015-028340, filed on Feb. 17, 2015, in the Japanese Patent Office (JPO), the disclosures of which are incorporated herein by reference in their entirety.

BACKGROUND

Technical Field

The present disclosure generally relates to an image processing apparatus, image processing method, and computer-readable medium.

Description of the Related Art

In extracting an image of an object included in an image, a method called background subtraction may be known widely and used commonly. This method may compare an input image (hereinafter the input image will mean an image resulting from imaging an object) with a background image which is an image captured without including the foreground (hereinafter the image captured without including the foreground will mean an image of an object in the input image) of the input image and extract an area which has changed from the background image by determining the area as being a foreground, where the input image and background image are prepared separately.

In the background subtraction method, a change in the background itself caused by appearance of shadows may be extracted by being determined to be a foreground, resulting in low extraction accuracy.

In some aspects, there may be a method that distinguishes a shadow area by analyzing an area including extracted object and shadows. In some aspects, there may be a method that extracts a foreground excluding a foreground-like shadow area by unifying a change assessment of luminosity having a somewhat wide tolerance and a change assessment of color tones (e.g., hue and saturation, color difference, or the like) having a narrow tolerance. This method may assume a monochromatic lighting environment and it is claimed that changes in the background due to shadows occur only in luminosity (luminance direction component).

For example, HSV (Hue, Saturation, Value) color space may be used to process brightness (luminosity) and color tones (hue and saturation) separately.

In some aspects, there may be a method for comparing only color tones out of chromaticity by normalizing values of each of RGB (Red, Green, Blue) channels (hereinafter the chromaticity will mean a relative value resulting from removing brightness from RGB values or the like, where the RGB values are those commonly used to display colors on screens of computers and the like).

In some aspects, these methods described above may be applicable when the color of shadows does not change from the color of the background under monochromatic lighting. In other aspects, the methods may not be applicable when the color of shadows changes to a color different from the color of the background under polychromatic lighting.

In some aspects, there may be a method for learning a relationship between changes in illumination intensity of direct light and changes in pixel values in a dichroic lighting environment made up of direct light (Id) and diffused light (Is), assuming that shadows are produced when direct light is blocked.

Lighting components in a background and shadow area in a dichroic lighting environment are illustrated in FIG. 14. The changes in the illumination intensity of the direct light may be controlled by a weighting factor $\alpha$ ($0 \leq \alpha \leq 1.0$). At this point, in the same background, lighting components acting on color information in a shadow-free state (background) and shadowed state (shadow) may be represented by Id+Is and $\alpha$Id+Is, respectively (hereinafter the color information will mean quantified color values represented by RGB, YUV, or HSV, where YUV represents luminance, blue color difference, and color difference from red). FIG. 15 is an explanatory diagram illustrating the above relationship in the RGB color space. The solid line represents the relationship between a shadow-free state and shadowed state obtained by learning, and any object existing on or near the solid line in the background is determined to be a shadow. An input pixel value distant from the solid line may be distinguished as belonging to a foreground.

In some aspects, there may be methods for calculating spectra using sunlight models.

Since some methods assume monochromatic lighting, shadows may not be distinguished properly when the color of shadows changes from the color of the background under the influence of other lighting.

In some aspects, some methods may not be applicable to an environment in which the color changes in an outdoor environment as in the case of sunlight, i.e., to a case in which the spectra of direct light and diffused light change. As an example, FIG. 16 illustrates an explanatory diagram of a case in which color information about direct light and diffused light differs from that existing during learning. A relationship learned in a certain lighting environment is indicated by a solid line. When the hues and saturation of direct light and diffused light change with time as in the case of sunlight, the relationship between the background and shadow in terms of color information exhibits a characteristic (indicated by a broken line here) different from that of the solid line existing at the time of learning. In this case, the shadow in this environment may not be distinguished properly unless the relationship indicated by the broken line is not learned anew. That is, this method may not be applicable to the outdoor environment in which the spectra of the direct light and diffused light of sunlight change from moment to moment.

In learning the relationship between changes in the illumination intensity of direct light and changes in pixel values, it may be often the case in actual practice that a state which is a shadowed state is learned erroneously as a shadow-free state. The relationship between background and shadow based on such erroneous learning data may take on a form such as illustrated in FIG. 17. In this state, when an input image captured in a shadow-free sunny place is used, it may not be possible to distinguish whether a portion making up the input image is a foreground or a shadow. This may be because with some methods shadow determination accuracy deteriorates due to mislearning. To improve the determination accuracy of this method, learning sets may be increased. In some aspects, a great deal of cost may be required for computation processes, and the method may be difficult for practical use.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to embodiments of the present disclosure, an image processing apparatus is disclosed. The image processing apparatus may include a memory storing instructions, and at least one processor configured to process the instructions to calculate a solar spectrum using a time at which an input image is captured, and a position at which the input image is captured, calculate an estimated background calculated to be close to a background included in the input image, using the input image and the solar spectrum, and output the estimated background.

According to embodiments of the present disclosure, an image processing apparatus is disclosed. The image processing apparatus may include a memory storing instructions, and at least one processor configured to process the instructions to calculate a solar spectrum using a time at which an input image is captured, and a position at which the input image is captured, calculate an estimated background calculated to be close to a background included in the input image, using the input image, a background image calculated from the input image, and the solar spectrum, and output the estimated background.

According to embodiments of the present disclosure, an image processing method is disclosed. The method may include calculating a solar spectrum using a time at which an input image and a background image are captured, and a position at which the input image and the background image are captured, calculating an estimated background calculated to be close to a background included in the input image, using the input image, the background image, and the solar spectrum, and outputting the estimated background.

BRIEF DESCRIPTION OF DRAWING

FIG. 4A is a conceptual diagram illustrating an exemplary shape of a likelihood function;

FIG. 4B is a conceptual diagram illustrating an exemplary shape of a likelihood function;

FIG. 5 is a conceptual diagram illustrating a processing of the image processing apparatus according to some aspects;

FIG. 7A is a conceptual diagram (the former part) illustrating a variation of the processing of the image processing apparatus according to some aspects;

FIG. 10C is a conceptual diagram (the latter part) illustrating the first variation of the processing of the image processing apparatus according to some aspects;

FIG. 11 is a conceptual diagram illustrating a second variation of the processing of the image processing apparatus according to some aspects;

FIG. 12 is a conceptual diagram illustrating an image processing apparatus according to some aspects;

DETAILED DESCRIPTION

The following description of illustrative, non-limiting embodiments discloses specific configurations, components, and processes. However, the embodiments are merely examples, and thus, the specific features described below are merely used to more easily describe such embodiments and to provide an overall understanding. Accordingly, one skilled in the art will readily recognize that the present invention is not limited to the specific embodiments described below. Furthermore, the descriptions of various configurations, components, and processes of the embodiments that would have been known to one skilled in the art are omitted for the sake of clarity and brevity.

Exemplary embodiments of an image processing apparatus, image processing method, and image processing program according to the present disclosure will be described below with reference to the drawings. It is assumed that in some aspects, the image processing apparatus may include both an image processing apparatus adapted to process still images and a video processing apparatus adapted to process moving images, i.e., a video, which can be viewed as a set of still images changing with the passage of time. This may similarly apply to the image processing method and image processing program.

<Examples of Aspects>

Some aspects may concern a minimum image processing apparatus.

[Configuration and Operation]

Figure 1:
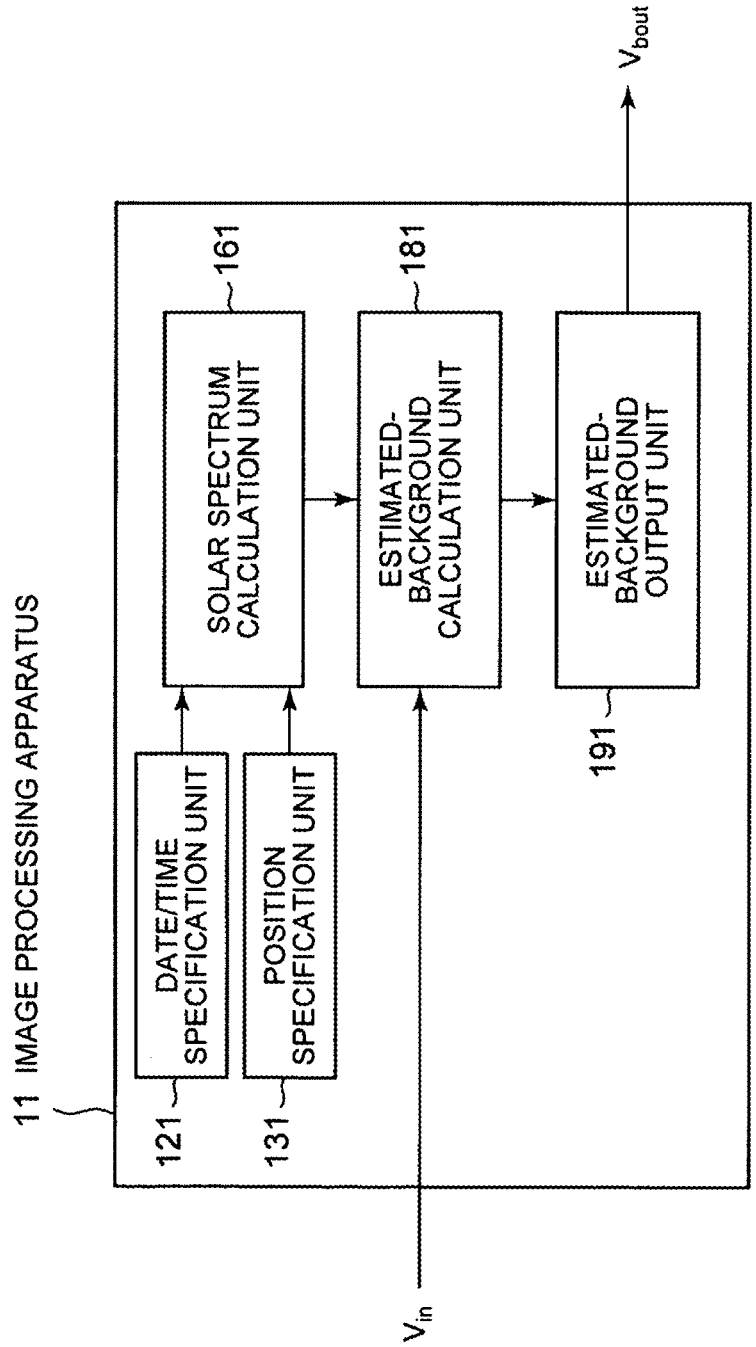
FIG. 1 is a conceptual diagram illustrating an image processing apparatus according to some aspects.

FIG. 1 is a conceptual diagram illustrating a configuration of the image processing apparatus according to some aspects.

In some aspects, the image processing apparatus 11 may include a date/time specification unit 121, a position specification unit 131, a solar spectrum calculation unit 161, an estimated-background calculation unit 181, and an estimated-background output unit 191.

The date/time specification unit 121 may specify the date and time which the solar spectrum calculation unit 161 uses for calculating a solar spectrum. The date and time may be the date and time when an input image are captured.

A signal including the specified date and time may be sent to the solar spectrum calculation unit 161 as a signal for use in subsequent processing.

The position specification unit 131 may specify the position which the solar spectrum calculation unit 161 uses for calculating the solar spectrum. The specified position may be the position on the earth at which the input image is captured. The specified position may be included in the signal for use in subsequent processing and sent to the solar spectrum calculation unit 161.

Based on the date and time sent from the date/time specification unit 121 and the position sent from the position specification unit 131, the solar spectrum calculation unit 161 may calculate the solar spectrum by a method using a sunlight model. A signal including the calculated solar spectrum may be sent to the estimated-background calculation unit 181.

An estimated-background calculation unit 181 may accept input of a signal (hereinafter the input signal will be referred to as an "input image signal") $V_{in}$ including an input image captured outdoors. The estimated-background calculation unit 181 may calculate an estimated background from color information on the input image and from the solar spectrum. The estimated background may be calculated as an image which is closest to the actual background, by using the calculated solar spectrum. The estimated background calculated as described above may be sent to the estimated-background output unit 191.

The estimated-background output unit 191 may output a signal including the estimated background sent from the estimated-background calculation unit 181, as a signal $V_{bout}$.

[Advantages]

In some aspects, to estimate color information about a background image close to an input image, the image processing apparatus may calculate the intensity, hues, and saturation of direct light and diffused light of sunlight using a solar spectrum model and calculate the background image close to the input image. In some aspects, a background image close to the input image may be calculated even in an outdoor environment in which illumination from sunlight changes with the lapse of time. Thus, when the image processing apparatus uses even an image captured outdoors, the image processing apparatus can calculate a background image close to an input image without a great deal of cost for computation processes.

<Other Examples of Aspects>

Some aspects may concern an image processing apparatus which calculates a background image close to an input image from an input image and background image captured separately.

[Configuration and Operation]

Figure 2:
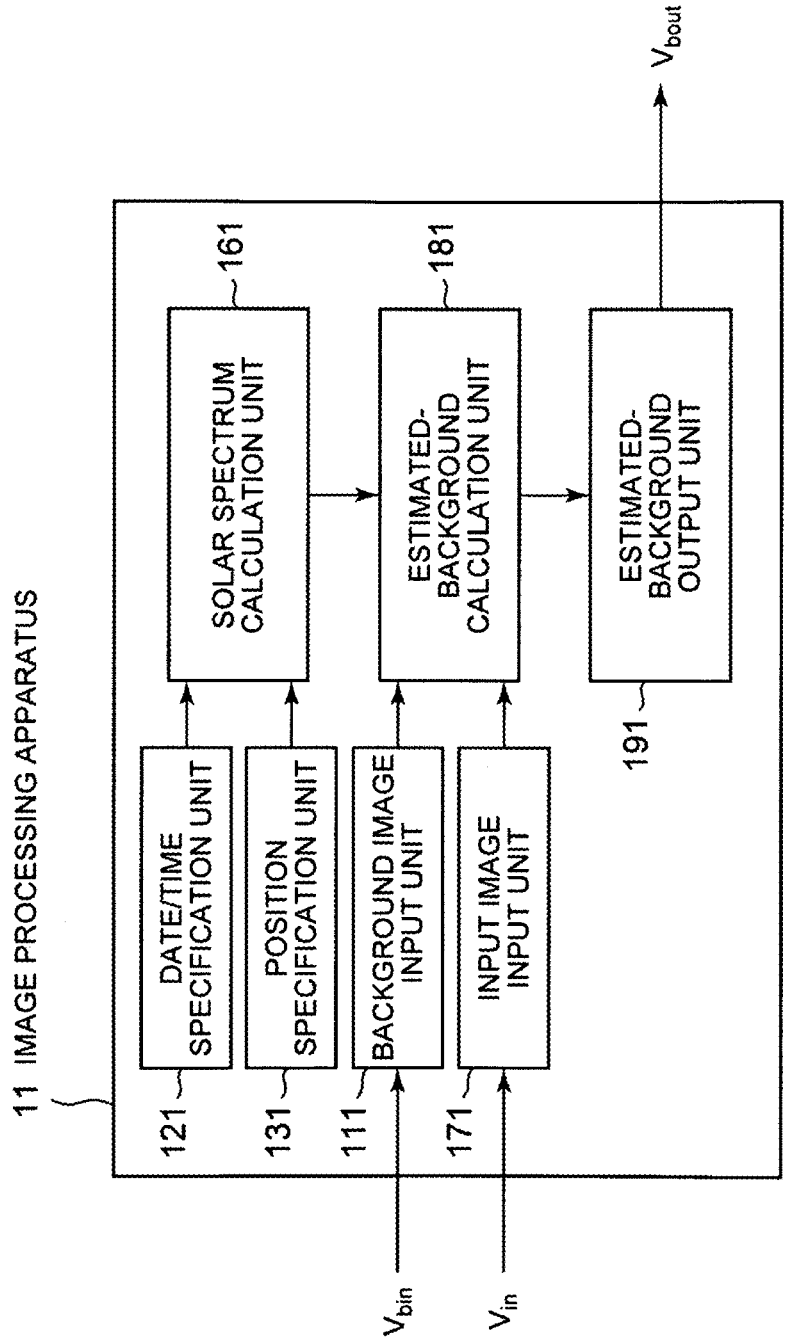
FIG. 2 is a conceptual diagram illustrating a structure of an image processing apparatus according to some aspects.

FIG. 2 is a conceptual diagram illustrating a configuration of the image processing apparatus according to some aspects.

The image processing apparatus 11 may include a date/time specification unit 121, a position specification unit 131, a solar spectrum calculation unit 161, a background image input unit 111, an input image input unit 171, an estimated-background calculation unit 181, and an estimated-background output unit 191.

The date/time specification unit 121 may specify the date and time which the solar spectrum calculation unit 161 uses for calculating a solar spectrum. The date and time may be the date and time when a background image and input image are captured.

A signal including the specified date and time may be sent to the solar spectrum calculation unit 161 as a signal for use in subsequent processing.

The position specification unit 131 may specify the position which the solar spectrum calculation unit 161 uses for calculating the solar spectrum. The specified position may be the position on the earth at which the background image and input image are captured. The specified position may be included in a signal for use in subsequent processing and sent to the solar spectrum calculation unit 161.

Based on the date and time sent from the date/time specification unit 121 and the position sent from the position specification unit 131, the solar spectrum calculation unit 161 may calculate the solar spectrum by a method using a sunlight model. A signal including the calculated solar spectrum may be sent to the estimated-background calculation unit 181.

The background image input unit 111 may accept input of a signal $V_{bin}$ including the background image as a signal for use in subsequent processing (hereinafter the input signal will be referred to as a "background image signal"). The background image may be an image captured outdoors. The signal may be sent to the estimated-background calculation unit 181.

The input image input unit 171 may accept input of a signal $V_{in}$ including the input image as a signal for use in subsequent processing (hereinafter the input signal will be referred to as an "input image signal"). The signal may be sent to the estimated-background calculation unit 181. The input image may be an image captured outdoors.

The estimated-background calculation unit 181 may calculate an estimated background based on color information about the background image sent from the background image input unit 111 and a solar spectrum. The estimated background calculated as described above may be sent to the estimated-background output unit 191.

The estimated-background output unit 191 may output a signal including the estimated background sent from the estimated-background calculation unit 181, as a signal $V_{bout}$.

[Advantages]

In some aspects, to estimate color information about a background image close to an input image, the image processing apparatus may calculate the intensity, hues, and saturation of direct light and diffused light of sunlight using a solar spectrum model and calculate the background image close to the input image. In some aspects, a background image close to the input image may be calculated even in an outdoor environment in which illumination from sunlight changes every moment. Thus, when the image processing apparatus uses even an image captured outdoors, the image processing apparatus according can calculate a background image close to an input image without a great deal of cost for computation processes.

<Other Examples of Aspects>

Some aspects may concern an image processing apparatus which assesses the likelihood that pixels making up an input image belong to a foreground.

[Configuration and Operation]

Figure 3:
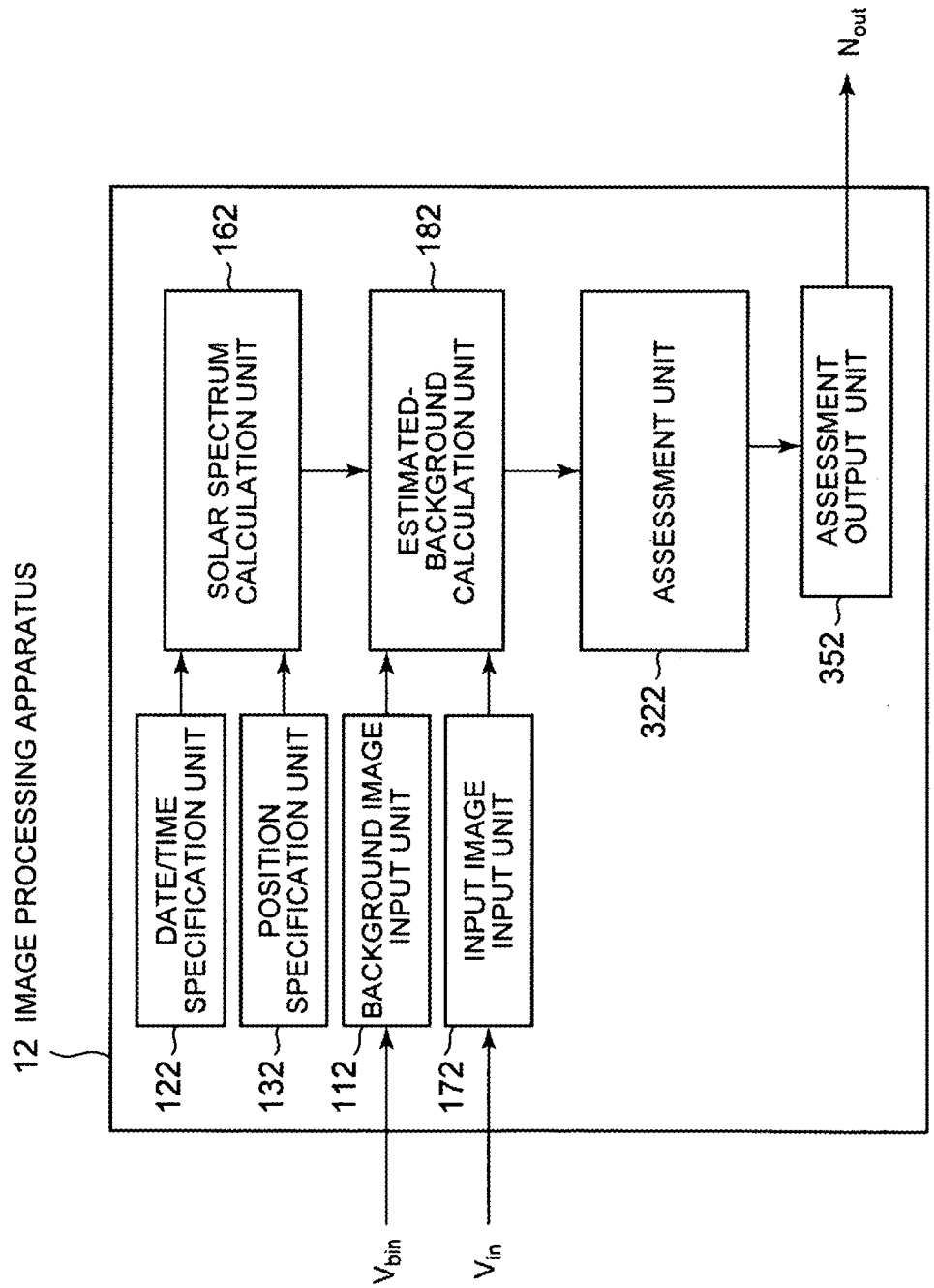
FIG. 3 is a conceptual diagram illustrating an image processing apparatus according to some aspects.

FIG. 3 is a conceptual diagram illustrating a configuration of the image processing apparatus according to some aspects.

The image processing apparatus 12 may include a date/time specification unit 122, a position specification unit 132, a solar spectrum calculation unit 162, a background image input unit 112, an input image input unit 172, an estimated-background calculation unit 182, an assessment unit 322, and an assessment output unit 352.

The date/time specification unit 122 may specify the date and time which the solar spectrum calculation unit 162 uses for calculating a solar spectrum. The date and time may be the date and time when a background image and input image are captured. The background image and input image may sometimes differ in image capturing time. In that case, a value calculated or selected from a capturing time of the background image and a capturing time of the input image (two points of time) may be used. For example, a value calculated by averaging the two points of time, either of the two points of time, or the like may be used. A signal including the specified date and time may be sent to the solar spectrum calculation unit 162 as a signal for use in subsequent processing.

The position specification unit 132 may specify the position which the solar spectrum calculation unit 162 uses for calculating the solar spectrum. The specified position may be the position on the earth at which the background image and input image are captured. The specified position may be included in a signal for use in subsequent processing and sent to the solar spectrum calculation unit 162.

Based on the date and time sent from the date/time specification unit 122 and the position sent from the position specification unit 132, the solar spectrum calculation unit 162 may calculate the solar spectrum by a method using a sunlight model. The calculation may be derived from a solar spectrum database created in advance. A signal including the calculated solar spectrum may be sent to the estimated-background calculation unit 182.

The background image input unit 112 may accept input of a background image signal $V_{bin}$ as a signal for use in subsequent processing. The background image may be captured outdoors. The signal may be sent to the estimated-background calculation unit 182.

The input image input unit 172 may accept input of an input image signal $V_{in}$ as a signal for use in subsequent processing. The input image may be captured outdoors. The signal may be sent to the estimated-background calculation unit 182.

Based on the solar spectrum sent from the solar spectrum calculation unit 162, color information about one pixel in interest in the background image, and color information about one pixel of the input image, the one pixel corresponding to the above-described one pixel in interest, the estimated-background calculation unit 182 may calculate an estimated background at the coordinates of the above-described one pixel in interest. The background image may be sent from the background image input unit 112 and the input image may be sent from the input image input unit 172. In some aspects, the estimated-background calculation unit 182 may output the estimated background related to the above-described one pixel in interest by obtaining the calculation described above and sending the estimated background to the assessment unit 322. To output the estimated background to the assessment unit 322 and the like, an estimated-background output unit (not illustrated) may be provided separately.

Using the estimated background related to the above-described one pixel in interest, the assessment unit 322 may assess the input image in relation to one pixel of the input image corresponding to the above-described one pixel in interest. A signal including results of the assessment may be sent to the assessment output unit 352.

The assessment output unit 352 may output a signal $N_{out}$ including the assessment sent from the assessment unit 322.

It is assumed that the background image and input image are captured almost at the same time on the same day. In some aspects, the date/time specification unit 122 may specify a single date and time for one pair of a background image and input image. The date/time specification unit 122 may specify the date and time based on either input from outside the date/time specification unit 122 or information stored in a storage unit (not illustrated) of the date/time specification unit 122.

It is assumed that the background image received from the background image input unit 112 and the input image received from the input image input unit 172 are captured at the same location. In some aspects, the position specification unit 132 may specify a single position for one pair of a background image and input image. Typically the position may be represented in latitude and longitude. The position specification unit 132 may specify the position based on either input from outside the position specification unit 132 or information stored in a storage unit of the position specification unit 132.

The solar spectrum calculation unit 162 may calculate the solar spectrum as follows.

Spectra of direct light $I_d$ and diffused light $I_s$ of sunlight in clear weather may be calculated from the input date and time and position. For the spectra calculations, for example, the well-known sunlight models may be used. The sunlight models may calculate solar zenith angle from the input date and time and position information. In some aspects, the solar spectrum calculation unit 162 may calculate an optical path along which the sunlight incident from outer space penetrates the atmosphere based on the solar zenith angle. In some aspects, the solar spectrum calculation unit 162 may calculate the respective spectra of the directly transmitted light and diffused light of sunlight based on the optical path. In some aspects, the solar spectrum calculation unit 162 may transform, the calculated spectra, for example, into color information on each channel in the RGB space. This information is represented by the following expression.

$$I_d^R, I_d^G, I_d^B, I_s^R, I_s^G, I_s^B$$

The estimated-background calculation unit 182 may calculate the estimated background by calculating color information (hereinafter referred to as "estimated background color") closest to the input image regarding the pixels making up the background image using the current input image, background image, and color information about the direct light and diffused light of the sun, which are accepted as input, where the color information about the direct light and diffused light of the sun is represented by:

$$(I_d^R, I_d^G, I_d^B, I_s^R, I_s^G, I_s^B).$$

That is, the estimated-background calculation unit 182 may compare color information between one pixel in interest (hereinafter referred to as "an input image pixel") in the input image and the pixel (hereinafter referred to as "a background image pixel") in the background image that corresponds in position to the input image pixel. Assuming that the color information about the input image pixel has changed from the color information about the background image pixel under the influence of changes in sunlight, the estimated-background calculation unit 182 may calculate the color information (hereinafter referred to as "estimated background color information") which will become closest to the color information about the input image pixel when the color information about the background image pixel changes under the influence of illumination from sunlight.

The pixel included in the estimated background may be referred to as "an estimated background pixel."

In some instances, the estimated-background calculation unit 182 may calculate the color information about the estimated background pixels as follows. It is assumed that the intensity of direct light changes while the intensity of diffused light remains unchanged.

Color information may be represented in various ways. In some aspects, an example in which RGB values commonly used as color information are used will be described below.

RGB values $L_d$ and $L_s$ of direct light and ambient light in a capturing scene may be represented as follows using the direct light $I_d$ and diffused light $I_s$ in clear weather calculated by the solar spectrum calculation unit 162 described above.

$$L_d^i = p I_d^i \tag{1}$$

$$L_s^i = q I_d^i + l I_s^i \tag{2}$$

where i may be any of channel R, G, and B in the RGB color space while p, q, and l may be coefficients which represent the intensity of direct light or diffused light.

RGB values $B^i$ of the background and RGB values $S^i$ of the estimated background may be represented as follows using the direct light $I_d$ and diffused light $I_s$ calculated by the solar spectrum calculation unit 162 described above.

$$B^i = r^i (L_d^i + L_s^i) = r^i((p+q)I_d^i + l\, I_s^i) \tag{3}$$

$$S^i = r^i L_s^i = r^i(q\, I_d^i + l\, I_s^i) \tag{4}$$

where $r^i$ may represent the reflectance of a floor surface on the channel i.

From Equations (3) and (4), the following relationship may hold between the RGB values $B^i$ of the background and RGB values $S^i$ of the estimated-background.

$$S^i = \frac{L_s^i}{L_d^i + L_s^i} B^i = \frac{q\, I_d^i + l\, I_s^i}{(p+q)I_d^i + l\, I_s^i} B^i = \frac{\frac{q}{l} I_d^i + I_s^i}{\frac{p+q}{l} I_d^i + I_s^i} B^i \tag{5}$$

$$= \frac{m I_d^i + I_s^i}{n I_d^i + I_s^i} B^i$$

where m=q/l and n=(p+q)/l. In the above equation, m and n may be unknown and the other terms may be known. Parameters m and n may be set so as to minimize the difference between the RGB values $C^i$ of the input image and RGB values $S^i$ of the estimated-background. For that, m and n which minimize an energy function E represented by the following equation may be derived.

$$E = \min_{m,n} \sum_i (C^i - S^i)^2 \tag{6}$$

In the RGB space, the G channel value may have the highest sensitivity and best represent brightness in typical image sensors. In some aspects, it is assumed that the estimated background and input image on the G channel are equal in brightness, i.e., $C^G = S^G$. Substituting this equation into Equation (3) may yield:

$$E = \min_{m,n}\{(C^R - S^R)^2 + (C^B - S^B)^2\} \tag{7}$$

When the braced terms on the right-hand side of Equation (7) are converted, it will be as follows:

$$E = \min_{m,n}\{(C^R - S^R)^2 + (C^B - S^B)^2\} \tag{8}$$

$$= \min_{m,n}\left\{\left(C^R - \frac{nI_d^R + I_S^R}{mI_d^R + I_S^R}B^R\right)^2 + \left(C^B - \frac{nI_D^B + I_S^B}{mI_d^B + I_S^B}B^B\right)^2\right\}$$

Based on the assumption that $C^G = S^G$, the following equation may hold.

$$C^G = S^G \tag{9}$$

$$= \frac{nI_D^G + I_S^G}{mI_d^G + I_S^G} B^G$$

Thus, m and n may be represented as follows.

$$C^G(mI_d^G + I_S^G) = (nI_d^G + I_S^G)B^G \tag{10}$$

$$mC^G I_d^G = B^G(nI_d^G + I_S^G) - C^G I_S^G$$

$$m = \frac{B^G}{C^G}\left(n + \frac{I_S^G}{I_d^G}\right) - \frac{I_S^G}{I_d^G}$$

In optimizing the braced terms on the right-hand side of Equation (8), optimizing E' denoted below may be considered by cancelling the denominators of the first and second terms in the braces. In this case, the terms in the braces may be optimized sufficiently.

$$E' = ((mI_d^R + I_S^R)C^R - (nI_d^R + I_S^R)B^R)^2 + ((mI_d^B + I_S^B)C^B - (nI_d^B + I_S^B)B^B)^2 \tag{11}$$

Substituting Equation (10) into Equation (11) may yield the following equation.

$$E' = \left(\left(\left(\frac{B^G}{C^G}\left(n + \frac{I_S^G}{I_d^G}\right) - \frac{I_S^G}{I_d^G}\right)I_d^R + I_S^R\right)C^R - (nI_d^R + I_S^R)B^R\right)^2 + \tag{12}$$

$$\left(\left(\left(\frac{B^G}{C^G}\left(n + \frac{I_S^G}{I_d^G}\right) - \frac{I_S^G}{I_d^G}\right)I_d^B + I_S^B\right)C^B - (nI_d^B + I_S^B)B^B\right)^2$$

E' may be a downward convex quadratic function with respect to n. In some aspects, if $n_0$ whose differential value is 0 exists in a domain of n, this $n_0$ may be a minimum value of n. If no $n_0$ whose differential value is 0 exists in the domain of n, a minimum value set in advance may be established as n. Calculating n which reduces the first derivative E'(n) of E' with respect to n to 0 may yield the following equation.

$$n = \frac{X + Y}{Z} \tag{13}$$

where $$X = (B^G C^R - B^R C^G)\left(\frac{I_S^G}{I_d^G}(C^G - B^G)C^R - \frac{I_S^R}{I_d^R}(C^R - B^R)C^G\right)$$

$$Y = (B^G C^B - B^B C^G)\left(\frac{I_S^G}{I_d^G}(C^G - B^G)C^B - \frac{I_S^B}{I_d^B}(C^B - B^B)C^G\right)$$

$$Z = (B^G C^R - B^R C^G)^2 + (B^G C^B - B^B C^G)^2$$

Substituting n into Equation (10) may yield m. Substituting m and n calculated as described above into Equation (5) may yield the RGB value S of the estimated background for the estimated background pixel.

The assessment unit 322 may assess whether each pixel of the input image belongs to the foreground as follows. Hereinafter, results of the assessment generated by the assessment will be referred to as the "assessment results."

Description will be given of a case in which assessment results are differences (hereinafter, referred to as "differences") between standardized RGB values of the input image pixel and standardized chromaticity of the corresponding estimated-background pixel.

The assessment unit 322 may calculate the differences calculated by the estimated-background calculation unit 182.

In some aspects, the assessment unit 322 may calculate the differences, for example, as differences between normalized RGB values as follows. Let sumC denotes the sum of the RGB values of the input image and let sumS denotes the sum of the RGB values of the estimated background color, then the following equations may hold.

$$\mathrm{sum}C = C^R + C^G + C^B \tag{14}$$

$$\mathrm{sum}S = S^R + S^G + C^B \tag{15}$$

If values obtained by normalizing the RGB values of input image and estimated background to sumC and sumS are $_{norm}C^R$, $_{norm}C^G$, $_{norm}C^B$, $_{norm}S^R$, $_{norm}S^G$, and $_{norm}S^B$, then the following equations may hold.

$$_{norm}C^R = \frac{C^R}{\mathrm{sum}C} \quad _{norm}C^G = \frac{C^G}{\mathrm{sum}C} \quad _{norm}C^B = \frac{C^B}{\mathrm{sum}C} \tag{16}$$

$$_{norm}S^R = \frac{S^R}{\mathrm{sum}S} \quad _{norm}S^G = \frac{C^G}{\mathrm{sum}S} \quad _{norm}S^B = \frac{C^B}{\mathrm{sum}S}$$

Differences $d^R$, $d^G$, and $d^B$ may be defined as follows.

$$d^R = |_{norm}C^R - _{norm}S^R|$$

$$d^G = |_{norm}C^G - _{norm}S^G|$$

$$d^B = |_{norm}C^B - _{norm}S^B| \tag{17}$$

The differences $d^R$, $d^G$, and $d^B$ may be the assessment results determined by the assessment unit 322. The smaller the values of the differences $d^R$, $d^G$, and $d^B$ are, the higher the assessed likelihood that the pixel belongs to the foreground may be.

The assessment results may be used either as they are or after manipulating.

Possible methods for manipulating the assessment results may include, for example, a method which involves selecting one or two of the assessment results and a method which involves performing computations on three or selected two of the assessment results. Examples of the assessment results manipulated as described above may include the following:
when one of the assessment results is selected: $d^R$, $d^G$, or $d^B$
when two of the assessment results are selected: $d^R$ and $d^B$, or the like
when selected two of the assessment results are added: $d^R + d^B$, or the like
when three of the assessment results are added: $d^R + d^G + d^B$, or the like
when selected two of the assessment results are multiplied: $d^R \times d^B$, or the like
when three of the assessment results are multiplied: $d^R \times d^G \times d^B$ An example of the assessment results may include likelihood determined by a likelihood function as described below.

The likelihood function f(d) may take 1 when the difference $d^i$ (i=R, G, B) is 0, gradually approach 0 with increases in the difference $d^i$, take 0 when the difference $d^i$ (i=R, G, B) is at a certain value, and have a range of 0 to 1 (both inclusive). In some aspects, the likelihood function $f_1(d^i)$ may be defined, for example, as follows.

$$f_1(d^i) = \min\{\max\{-a \times d^i + 1.0, 0\}, 1.0\} \tag{18}$$

where $d^i$ may be a difference calculated by the assessment unit 322 and a may be a parameter which takes a positive value and be manually set to an appropriate value. The likelihood function $f_1(d^i)$ may have a shape such as illustrated in FIG. 4A.

In some aspects, examples of the likelihood function may include the linear function represented by Equation (18), and a likelihood function $f_2(d^i)$ having a shape such as illustrated in FIG. 4B.

Likelihoods $f(d^R)$, $f(d^G)$, and $f(d^B)$ with respect to $d^R$, $d^G$, and $d^B$, respectively, may be calculated.

The likelihoods may be used as assessment results either as they are or after manipulating.

Possible methods for manipulating the likelihoods may include, for example, a method which involves selecting one or two of the likelihoods as assessment results, a method which involves performing computations on three or selected two of the likelihoods as assessment results, and so on. Examples of these methods may be similar to a case in which differences are used as assessment results.

[Processing of the Image Processing Apparatus]

FIG. 5 is a conceptual diagram illustrating a processing of the image processing apparatus according to some aspects.

In step S201, the date/time specification unit 122 may specify the date and time used by the solar spectrum calculation unit 162 to calculate a solar spectrum. The date/time specification unit 122 may send a signal Va including the specified date and time to the solar spectrum calculation unit 162.

In step S202, the position specification unit 132 may specify the position used by the solar spectrum calculation unit 162 to calculate the solar spectrum. The position specification unit 132 may send a signal Vb including the specified position to the solar spectrum calculation unit 162.

In step S203, based on the date and time sent from the date/time specification unit 122 and the position sent from the position specification unit 132, the solar spectrum calculation unit 162 may calculate the solar spectrum by a method using a sunlight model. A signal Vc including the calculated solar spectrum may be sent to the estimated-background calculation unit 182.

In step S204, the background image input unit 112 may turn the signal $V_{bin}$ including the background image into a signal Vd including the background image and send the signal Vd to the estimated-background calculation unit 182.

In step S205, the input image input unit 172 may turn the input image signal $V_{in}$ into a signal Ve including an input image and send the signal Ve to the estimated-background calculation unit 182.

In step S206, the estimated-background calculation unit 182 may do the following process using the solar spectrum sent from the solar spectrum calculation unit 162 and one pixel in interest of the background image sent from the background image input unit 112. That is, based on the color information about the pixel in interest as well as on color information about a pixel, which corresponds to the above-described one pixel in interest, of the input image sent from the input image input unit 172, the estimated-background calculation unit 182 may calculate an estimated background at the coordinate of the one pixel in interest by the method described above. A signal Vf including the estimated background at the one pixel in interest may be sent to the assessment unit 322.

In step S207, the assessment unit 322 may assess the input image in relation to the corresponding pixel of the input image by the method described above, using the estimated background related to the one pixel in interest described above. A signal Vg including assessment results may be sent to the assessment output unit 352.

In step S208, the assessment output unit 352 may output the assessment results sent from the assessment unit 322.

[Description of Advantages]

In some aspects, the image processing apparatus may assess the likelihood that a portion included in an input image captured outdoors belongs to a foreground.

<Other Examples of Aspects>

Some aspects may concern an image processing apparatus which assesses whether each of all targeted pixels making up an input image belongs to a foreground using the configuration of the image processing apparatus.

[Processing of the Image Processing Apparatus]

A processing of the image processing apparatus will be described below based on the configuration and components operation of the image processing apparatus, where the concept of the configuration has been illustrated in FIG. 3 and the components operation has been described with reference to FIG. 3.

Figure 6:
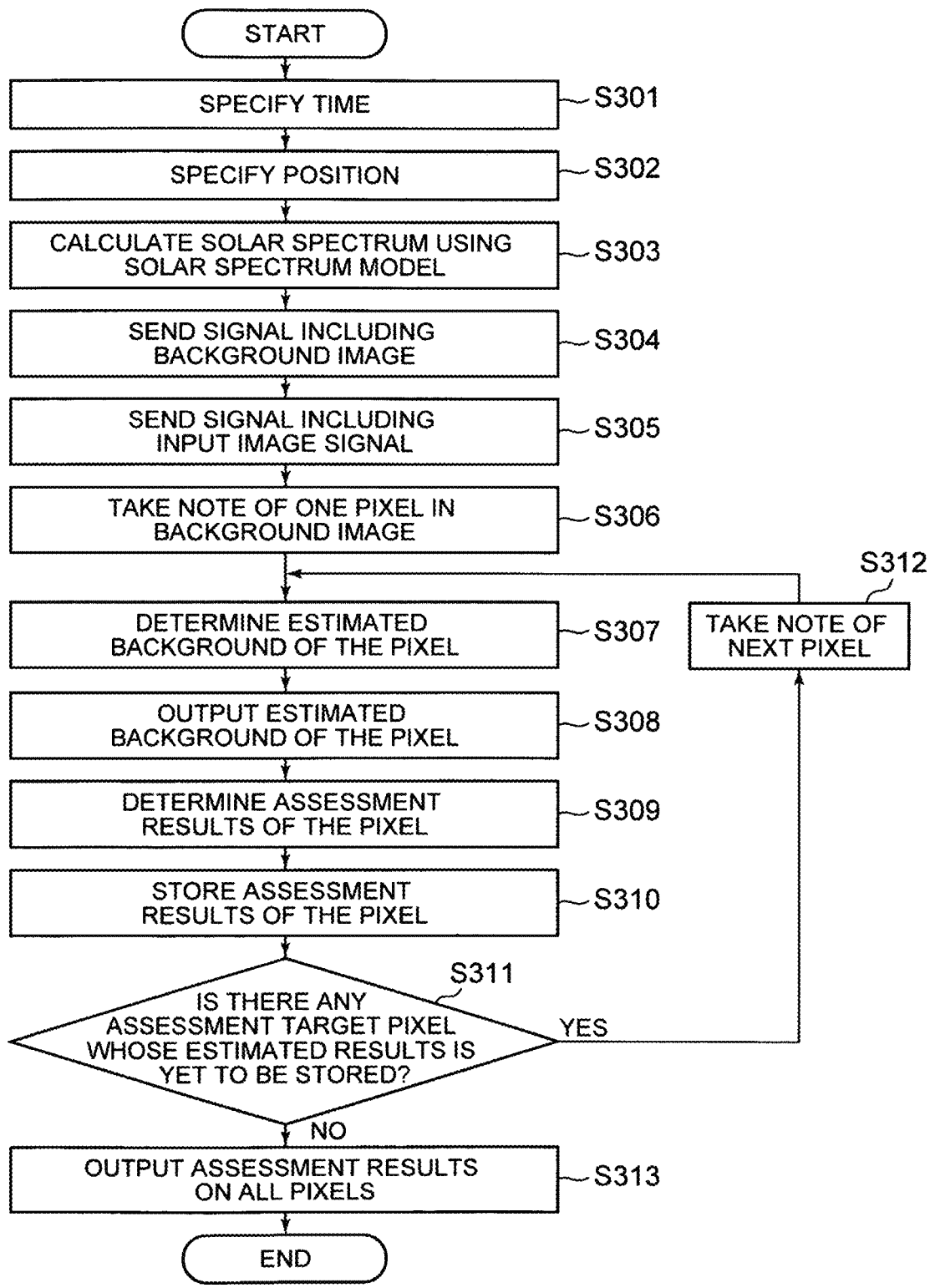
FIG. 6 is a conceptual diagram illustrating a processing of an image processing apparatus according to some aspects.

FIG. 6 is a conceptual diagram illustrating a processing of the image processing apparatus according to some aspects.

In step S301, the date/time specification unit 122 may specify the date and time used by the solar spectrum calculation unit 162 to calculate a solar spectrum. In some aspects, the date/time specification unit 122 may send a signal including the specified date and time to the solar spectrum calculation unit 162 as a signal for use in subsequent processing.

In step S302, the position specification unit 132 may specify the position used by the solar spectrum calculation unit 162 to calculate the solar spectrum. In some aspects, the position specification unit 132 may send the specified position to the solar spectrum calculation unit 162 as a signal for use in subsequent processing.

In step S303, based on the date and time sent from the date/time specification unit 122 and the position sent from the position specification unit 132, the solar spectrum calculation unit 162 may calculate the solar spectrum by a method using a sunlight model. A signal including the calculated solar spectrum may be sent to the estimated-background calculation unit 182.

In step S304, the background image input unit 112 may turn the input signal $V_{bin}$ including the background image into a signal Vd for use in subsequent processing and send the signal Vd to the estimated-background calculation unit 182.

In step S305, the input image input unit 172 may send the input image signal $V_{in}$ to the estimated-background calculation unit 182 as a signal for use in subsequent processing.

In step S306, the estimated-background calculation unit 182 may take note of one pixel in interest in the background image sent from the background image input unit 112.

In step S307, based on the solar spectrum sent from the solar spectrum calculation unit 162, color information about the one pixel in interest in the background image, and color information about a corresponding pixel, which corresponds to the above-described one pixel in interest, of the input image, the estimated-background calculation unit 182 may calculate an estimated background at the coordinate of the one pixel in interest. In step S308, the estimated-background calculation unit 182 may output the estimated background related to the above-described one pixel in interest by obtaining the calculation described above and send the estimated background to the assessment unit 322.

In step S309, the assessment unit 322 may assess the input image in relation to a corresponding pixel of the input image, using the estimated background related to the above-described one pixel in interest.

In step S310, the assessment unit 322 may store assessment results in a storage unit.

In step S311, the estimated-background calculation unit 182 may determine whether there is any assessment target pixel of the background image whose assessment results are yet to be stored. This process may be carried out by a component other than the estimated-background calculation unit 182.

If there are assessment target pixels whose assessment results are yet to be stored ("Yes" in step S311), in step S312, the image processing apparatus may take note of one of the pixels. The processes of step S307 and subsequent steps may be carried out with respect to this pixel.

If there is no assessment target pixel whose assessment results are yet to be stored ("No" in step S311), the processing of the image processing apparatus may proceed to step S313.

In step S313, the assessment output unit 352 may output the assessment results on corresponding pixels of the input image, regarding all the targeted background pixels.

Figure 7B:
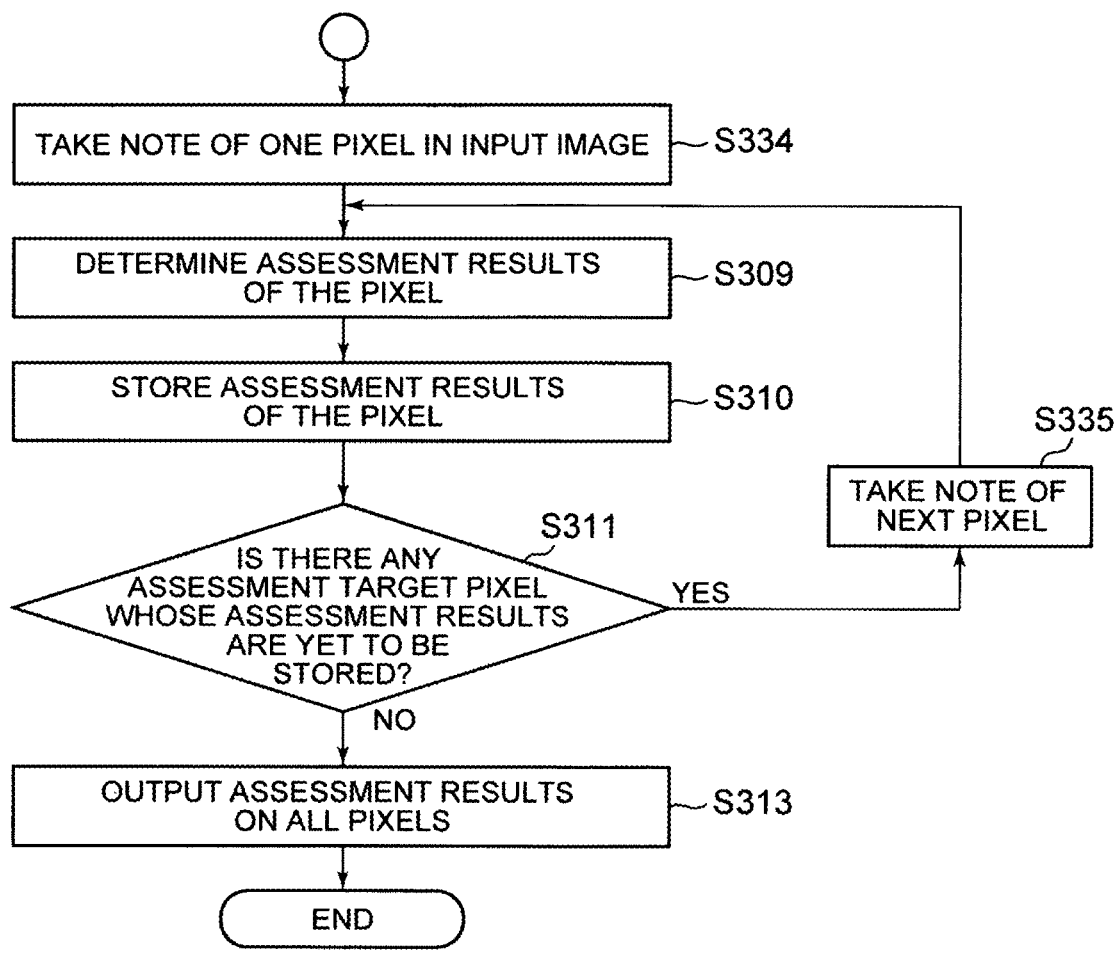
FIG. 7B is a conceptual diagram (the latter part) illustrating the variation of the processing of the image processing apparatus according to some aspects.

FIGS. 7A and 7B are conceptual diagrams illustrating a variation of the processing of the image processing apparatus according to some aspects.

In some aspects, steps S301 to S313 in FIGS. 7A and 7B may be similar in description to corresponding steps denoted by the same numbers in FIG. 6.

In the example of FIG. 6, after a pixel is processed up to S311, the next pixel may be processed from steps S307 to S310. In the examples of FIGS. 7A and 7B, in step S331, the assessment output unit 352 may determine whether there is any assessment target pixel whose estimated background is yet to be stored. If there are assessment target pixels whose assessment results are yet to be stored ("Yes" in step S331), the processing of steps S307 and S308 may be carried out for the next assessment target pixel whose estimated background is yet to be stored. That is, an estimated background may be output for every targeted pixel. In the examples of FIGS. 7A and 7B, in step S332, the image processing apparatus may take note of another pixel anew. Then the processing of steps S309 and S311 may be carried out with respect to this pixel. If the assessment output unit 352 determines that there are assessment target pixels whose assessment results are yet to be stored ("Yes" in step S311), in step S335, the image processing apparatus may take note of the next assessment target pixel whose assessment results are yet to be stored. Then, the processing of the image processing apparatus may proceed to step S309 (in the example of FIG. 6, the processing of the image processing apparatus may proceed to step S307).

If there are not any assessment target pixels whose assessment results are yet to be stored ("No" in step S331), the processing of the image processing apparatus may proceed to step S333.

In step S333, the assessment output unit 352 may output the assessment results on corresponding pixels of the input image, regarding all the targeted background pixels.

[Description of Advantages]

In some aspects, regarding every targeted pixel in the input image, the image processing apparatus can assess the likelihood that the pixel belongs to the foreground.

<Other Examples of Aspects>

Some aspects may concern an image processing apparatus which extracts a foreground from an input image using assessment results.

[Configuration and Operation]

Figure 8:
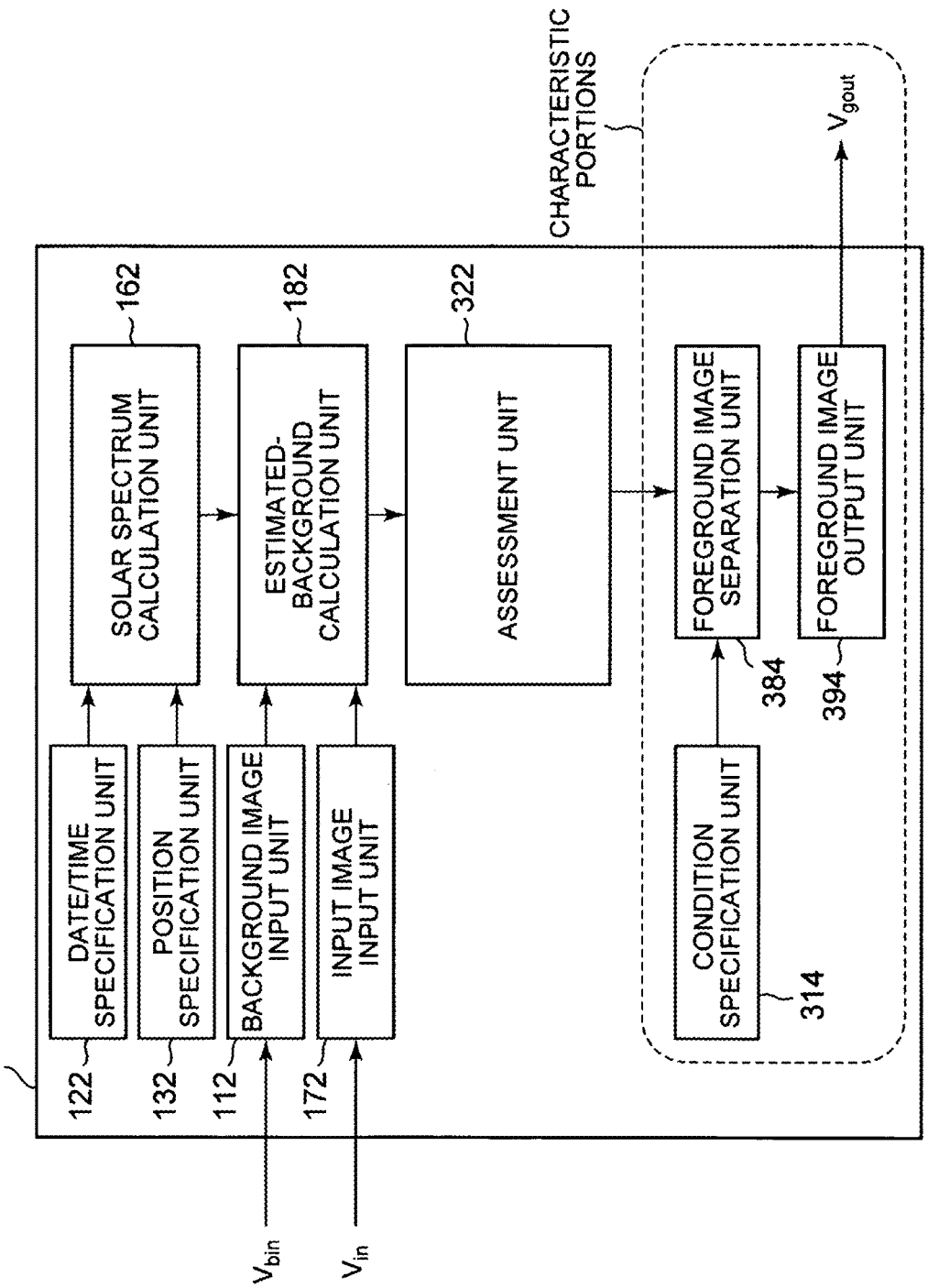
FIG. 8 is a conceptual diagram illustrating a configuration of an image processing apparatus according to some aspects.

FIG. 8 is a conceptual diagram illustrating a configuration of the image processing apparatus according to some aspects.

The image processing apparatus 14 may include a date/time specification unit 122, a position specification unit 132, a solar spectrum calculation unit 162, and a background image input unit 112. In some aspects, the image processing apparatus 14 may include an input image input unit 172, an estimated-background calculation unit 182, an assessment unit 322, a foreground image separation unit 384, and a foreground image output unit 394.

A condition specification unit 314, the foreground image separation unit 384, and the foreground image output unit 394 in a dotted box in FIGS. 7A and 7B may be characteristic portions. Other components may be the same as the above-described respective components except for those points which are described below.

The assessment unit 322 may send a signal including assessment results to the foreground image separation unit 384.

The condition specification unit 314 may specify conditions for use by the foreground image separation unit 384 in determining assessment results and turn the conditions into a signal for use in subsequent processing.

Based on the assessment results sent from the assessment unit 322, the foreground image separation unit 384 may extract (separate) a foreground image from the input image sent from input image input unit 172 either directly or through the estimated-background calculation unit 182. A signal including the extracted foreground image may be sent to the foreground image output unit 394.

The foreground image output unit 394 may output a signal $V_{gout}$ including the foreground image sent from a foreground image separation unit 384.

The conditions specified by the condition specification unit 314 and used by the foreground image separation unit 384 to determine assessment results may be set appropriately according to the type of assessment results produced by the assessment unit 322 and used by the foreground image separation unit 384 to separate the foreground image. The conditions to be specified may be input from outside the condition specification unit 314 or taken from information stored in a storage unit of the condition specification unit 314.

Regarding each pixel of the input image, the foreground image separation unit 384 may store the same color information for the pixel as the foreground image when the assessment results of the pixel meet the conditions sent from the condition specification unit 314. The foreground image separation unit 384 may not store color information for the pixel when the assessment results of the pixel do not meet the conditions. Examples of this operation may include following examples.

EXAMPLE 1

Regarding an input image pixel of a certain input image, if an assessment result is likelihood $f(d^R)$ and a condition is A or below, the foreground image separation unit 384 may store the same color information as the pixel in the input image whose likelihood $f(d^R)$ is A or below. The foreground image separation unit 384 may not store color information when the likelihood $f(d^R)$ is higher than A.

EXAMPLE 2

Regarding an input image pixel of a certain input image, if assessment results are likelihood $f(d^R)$ and likelihood $f(d^B)$ and conditions are A or below for the likelihood $f(d^R)$ and B or below for the likelihood $f(d^B)$, the foreground image separation unit 384 may store the same color information as the pixel in the input image is stored when the likelihood $f(d^R)$ and likelihood $f(d^B)$ match with the condition. The foreground image separation unit 384 may not store color information when either the likelihood $f(d^R)$ is higher than A or the likelihood $f(d^B)$ is higher than B.

EXAMPLE 3

Regarding an input image pixel of a certain input image, if assessment results are likelihood $f(d^R)$, likelihood $f(d^B)$ and likelihood $f(d^G)$ and conditions are A or below for the likelihood $f(d^R)$ and B or below for the likelihood $f(d^B)$ and C or below for the likelihood $f(d^G)$, the foreground image separation unit 384 may store the same color information as the pixel in the input image when the likelihood $f(d^R)$ and likelihood $f(d^B)$ match with the condition. The foreground image separation unit 384 may not store color information when the likelihood $f(d^R)$ is higher than A or the likelihood $f(d^B)$ is higher than B or the likelihood $f(d^G)$ is higher than C.

EXAMPLE 4

Regarding an input image pixel of a certain input image, if an assessment result is the product of likelihood $f(d^R)$ and likelihood $f(d^B)$ and a condition is that the product of the likelihood $f(d^R)$ and likelihood $f(d^B)$ is D or below, the foreground image separation unit 384 may store the same color information as the pixel in the input image when the product of the likelihood $f(d^R)$ and likelihood $f(d^B)$ matches with the condition. The foreground image separation unit 384 may not store color information when the product of the likelihood $f(d^R)$ and likelihood $f(d^B)$ is larger than D.

EXAMPLE 5

Regarding an input image pixel of a certain input image, if an assessment result is the product of likelihood $f(d^R)$ and likelihood $f(d^B)$ and likelihood $f(d^G)$ and a condition is that the product of likelihood $f(d^R)$ and likelihood $f(d^B)$ and likelihood $f(d^G)$ is E or below, the foreground image separation unit 384 may store the same color information as the pixel in the input image when the product of likelihood $f(d^R)$ and likelihood $f(d^B)$ and likelihood $f(d^G)$ matches with the condition. The foreground image separation unit 384 may not store color information when the product of likelihood $f(d^R)$ and likelihood $f(d^B)$ and likelihood $f(d^G)$ is larger than E.

When differences $d^R$, $d^B$, and $d^G$ rather than likelihoods are used as assessment results, description may be given by replacing the likelihoods $f(d^R)$, $f(d^B)$, and $f(d^G)$ with the differences $d^R$, $d^B$, and $d^G$, respectively, in Examples 1 to 5.

[Processing of the Image Processing Apparatus]

Figure 9A:
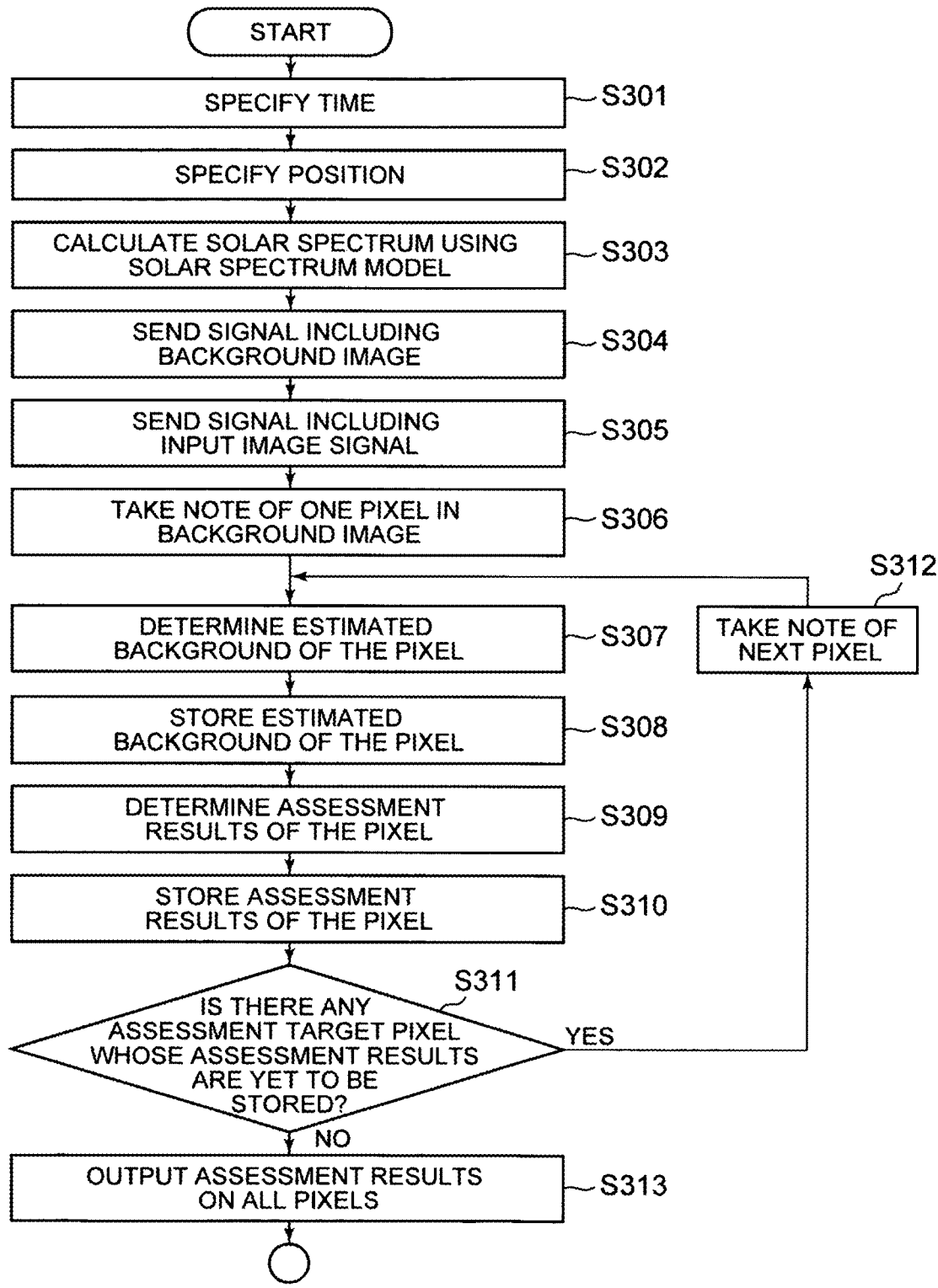
FIG. 9A is a conceptual diagram (the former part) illustrating a processing of the image processing apparatus according to some aspects.
Figure 9B:
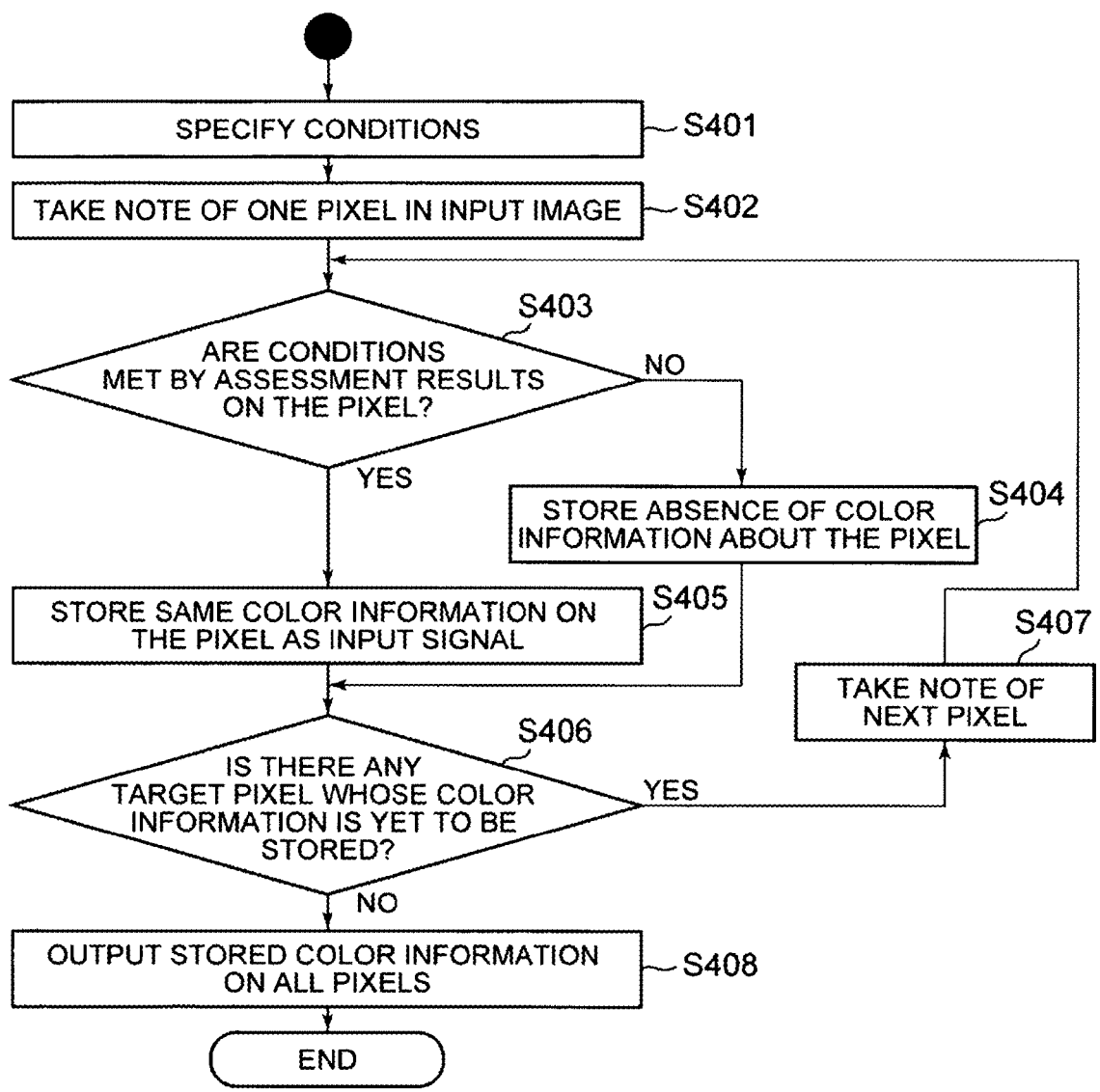
FIG. 9B is a conceptual diagram (the latter part) illustrating the processing of the image processing apparatus according to some aspects.

FIGS. 9A and 9B are conceptual diagrams illustrating a processing of the image processing apparatus according to some aspects.

After the processing of which a conceptual diagram is provided in FIG. 6, the processes of step S401 and subsequent steps may be carried out. In FIGS. 9A and 9B, the processes of steps S301 to S312 may be similar in description to respective steps denoted by the same numbers in FIG. 6.

In step S401, the condition specification unit 314 may specify conditions for use by the foreground image separation unit 384 in determining assessment results and turn the conditions into a signal for use in subsequent processing.

In step S402, the foreground image separation unit 384 may take note of one pixel in the input image sent from input image input unit 172 either directly or through the estimated-background calculation unit 182 and determine to carry out subsequent processing on the pixel. In some aspects, the determination may be made outside the foreground image separation unit 384.

In step S403, the foreground image separation unit 384 may determine whether the assessment results on the pixel sent from the assessment unit 322 meet the conditions sent from the condition specification unit 314.

When the conditions are not met ("No" in step S403), in step S404, the foreground image separation unit 384 may store the absence of color information about the pixel, and the processing of the image processing apparatus may proceed to step S406.

When the conditions are met ("Yes" in step S403), in step S405, the color information about the pixel in the input image may be stored.

In step S406, the foreground image separation unit 384 may determine whether the input image includes any target pixel whose color information is yet to be stored. If the input image includes any target pixels whose color information is yet to be stored ("Yes" in step S406), in step S407, the foreground image separation unit 384 may take note of one of the pixels, and the processing of the image processing apparatus may proceed to step S403.

If the input image includes no target pixel whose color information is yet to be stored ("No" in step S406), the processing of the processing of the image processing apparatus may proceed to step S408.

In step S408, the foreground image output unit 394 may output color information on all the pixels, that is, a signal including the foreground image.

Figure 10A:
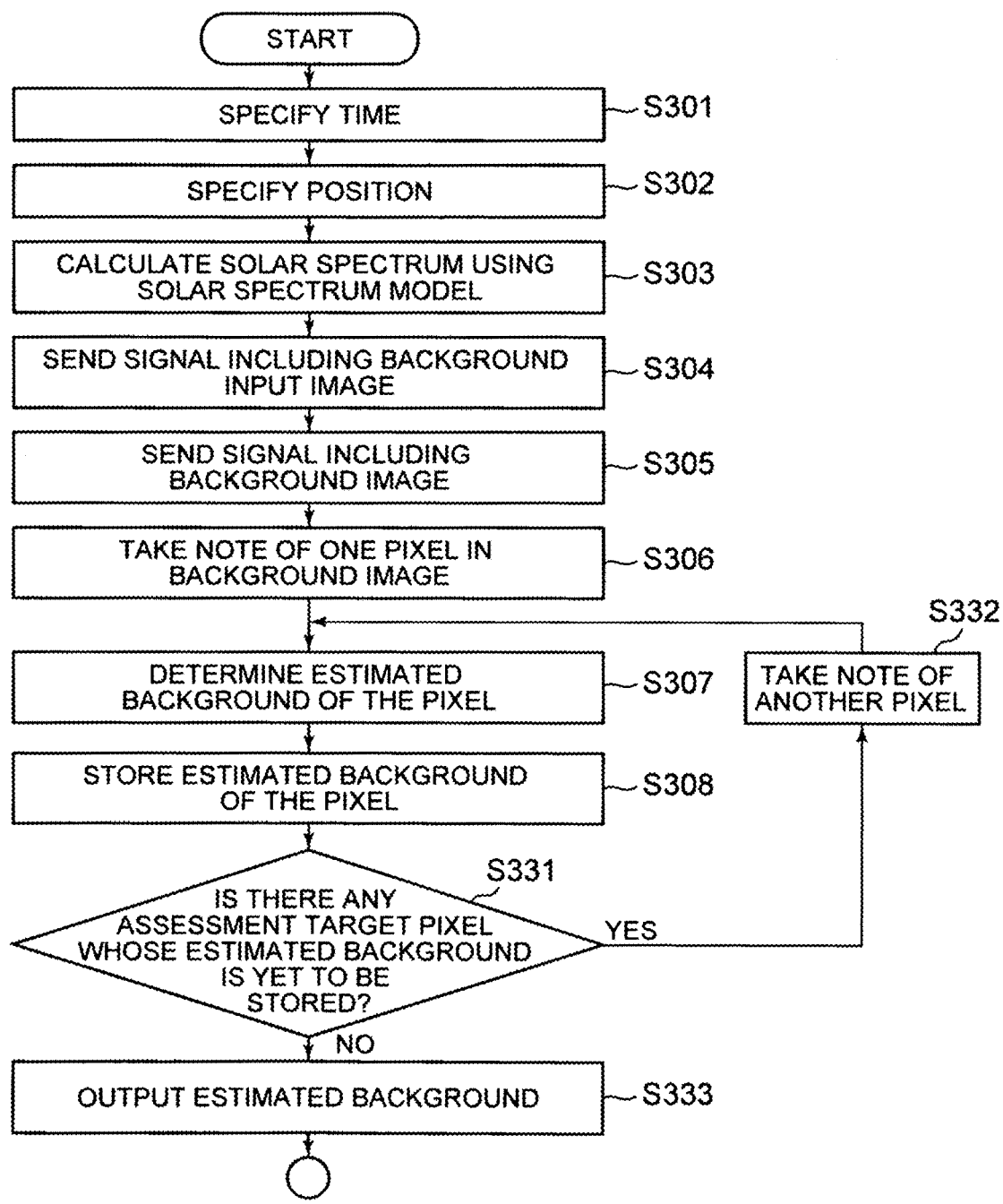
FIG. 10A is a conceptual diagram (the former part) illustrating a first variation of the processing of the image processing apparatus according to some aspects.
Figure 10B:
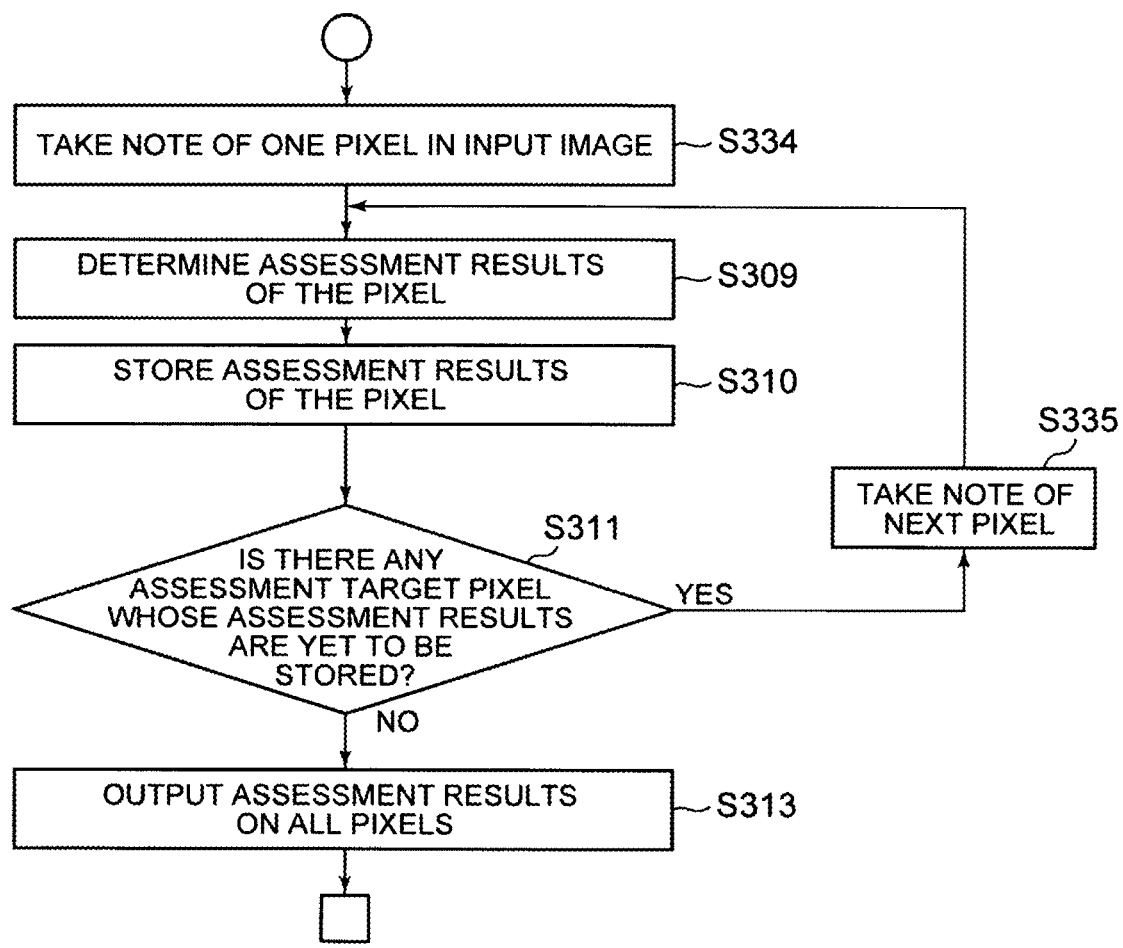
FIG. 10B is a conceptual diagram (the middle part) illustrating the first variation of the processing of the image processing apparatus according to some aspects.

FIGS. 10A to 10C are conceptual diagrams illustrating a first variation of the processing of the image processing apparatus according to some aspects.

In some aspects, after the processes of FIGS. 7A and 7B are carried out instead of the processes of FIG. 6, the processes of step S401 and subsequent steps in FIGS. 9A and 9B may be carried out.

The processes may be similar in description to respective steps denoted by the same numbers in FIGS. 5 and 8.

FIG. 11 is a conceptual diagram illustrating a second variation of the processing of the image processing apparatus according to some aspects.

In some aspects, after the process of step S310, without returning to processes earlier than step S310, the processes of step S403 and subsequent steps may be carried out with respect to the pixel noted before step S310 by maintaining taking note of the pixel.

If it is determined in step S406 that there are assessment target pixels whose color information is yet to be stored, in step S410, the estimated-background calculation unit 182 may take note of one of the pixels, and the processing of the image processing apparatus may proceed to step S307 (in the examples of FIGS. 9B and 10C, the processing of the image processing apparatus may proceed to step S403).

The processes may be similar in description to corresponding steps denoted by the same numbers in FIGS. 6 and 9.

Some aspects illustrated in FIG. 11 can extract a foreground using a smaller number of steps in the processing than those in the processing illustrated in the combination of FIGS. 9A and 9B, or the combination of FIGS. 10A, 10B and 10C.

[Advantages]

In some aspects, the image processing apparatus may extract a foreground from an input image captured outdoors.

<Other Examples of Aspects>

Some aspects may concern an image processing apparatus which uses a background image derived from an input image as a background image rather than accepting input of a background image separately from an input image.

[Configuration and operation]

In some aspects, the image processing apparatus may not include the background image input unit 112 in the configuration of the image processing apparatus illustrated in FIG. 8.

[Processing of the Image Processing Apparatus]

The image processing apparatus may derive a background image from an input image. A processing thereof will be described below.

The input image input unit 172 may accept input of an input image at a given time t=T. The input image input unit 172 may send a signal including the image to the estimated-background calculation unit 182.

The input image input unit 172 may accept input of an input image at a time t=T+ΔT, i.e., after a lapse of a time ΔT after T. The input image input unit 172 may send a signal including the image to the estimated-background calculation unit 182.

The input image input unit 172 may take note of one pixel in the input image.

The input image input unit 172 may use B(T+ΔT)=(1−α)B(T)+αC(T+ΔT), where B(t) may be a background image derived from the input image and related to the given pixel, C(t) may be the input image including the given pixel, and α may be a parameter which determines a weight of the input image. An initial value of B(T) may be C(T) input input image input unit 172 at time T.

The processes of calculating B(T) may be performed on all the targeted pixels of the input image.

Subsequently, the processes of steps S308 to S410 in FIG. 11 may be carried out. Consequently, the process of step S408 may be carried out.

Then, the processes of calculating B(t), the processes of steps S308 to S410 in FIG. 11 may be carried out with respect to the input entered at the time t=T+ΔT.

α may be set to be proportional to the foreground likelihood of each pixel in the input image C(t) in the second and subsequent iterations of the present processing. In the first iteration of the present processing, any value may be input.

In some aspects, the foreground in the input image may move in a relatively short time, and disappear from the input image. This may be the case when the foreground is a movable object such as a person, animal, or automobile. In such a case, the background may be extracted from the input image by repeating the processes in the processing described above. Using the background, processes described in the above aspects may be carried out, including the calculation of the estimated background carried out by the estimated-background calculation unit 182, the assessment carried out by the assessment unit 322, and the separation of the foreground image carried out by the foreground image separation unit 384.

[Advantages]

In some aspects, the image processing apparatus may provide the advantages described above without inputting of a background image separately from an input image.

<Other Examples of Aspects>

[Configuration and Operation]

FIG. 12 is a conceptual diagram illustrating an image processing apparatus according to some aspects.

In some aspects, the image processing apparatus 13 may include an input image input unit 176, a background image generating unit 156, a background image input unit 116, a date/time specification unit 126, a position specification unit 136, a solar spectrum calculation unit 166, an estimated-background calculation unit 186, and an estimated-background output unit 196.

The solar spectrum calculation unit 166 and estimated-background calculation unit 186 may be the same in description as the solar spectrum calculation unit 162 and estimated-background calculation unit 182 in FIG. 3 except for those points which are described below. Other components will be described below.

The date/time specification unit 126 may specify the date and time used by the solar spectrum calculation unit 166 to calculate a solar spectrum. A signal including the specified date and time may be sent to the solar spectrum calculation unit 166 as a signal for use in subsequent processing.

The position specification unit 136 may specify the position used by the solar spectrum calculation unit 166 to calculate the solar spectrum. The specified position may be the position on the earth at which the input image is captured. The specified position may be included in a signal for use in subsequent processing and sent to the solar spectrum calculation unit 166.

The input image input unit 176 may accept input of plural input images captured at a same location at different times. In some aspects, it is assumed that while the plural input images are being captured, the foreground in the input images moves out of the input images. A signal including the input images may be sent to the background image generating unit 156.

The background image generating unit 156 may generate a background image from the plural input images that are sent from the input image input unit 176 and that have different image capturing time. A signal including the generated background image may be sent to the background image input unit 116.

The background image input unit 116 may input the background image sent from the background image generating unit 156 to the estimated-background calculation unit 186.

The estimated-background output unit 196 may output a signal $V_{out}$ including the estimated background sent from the estimated-background calculation unit 186.

[Processing of the Image Processing Apparatus]

Figure 13:
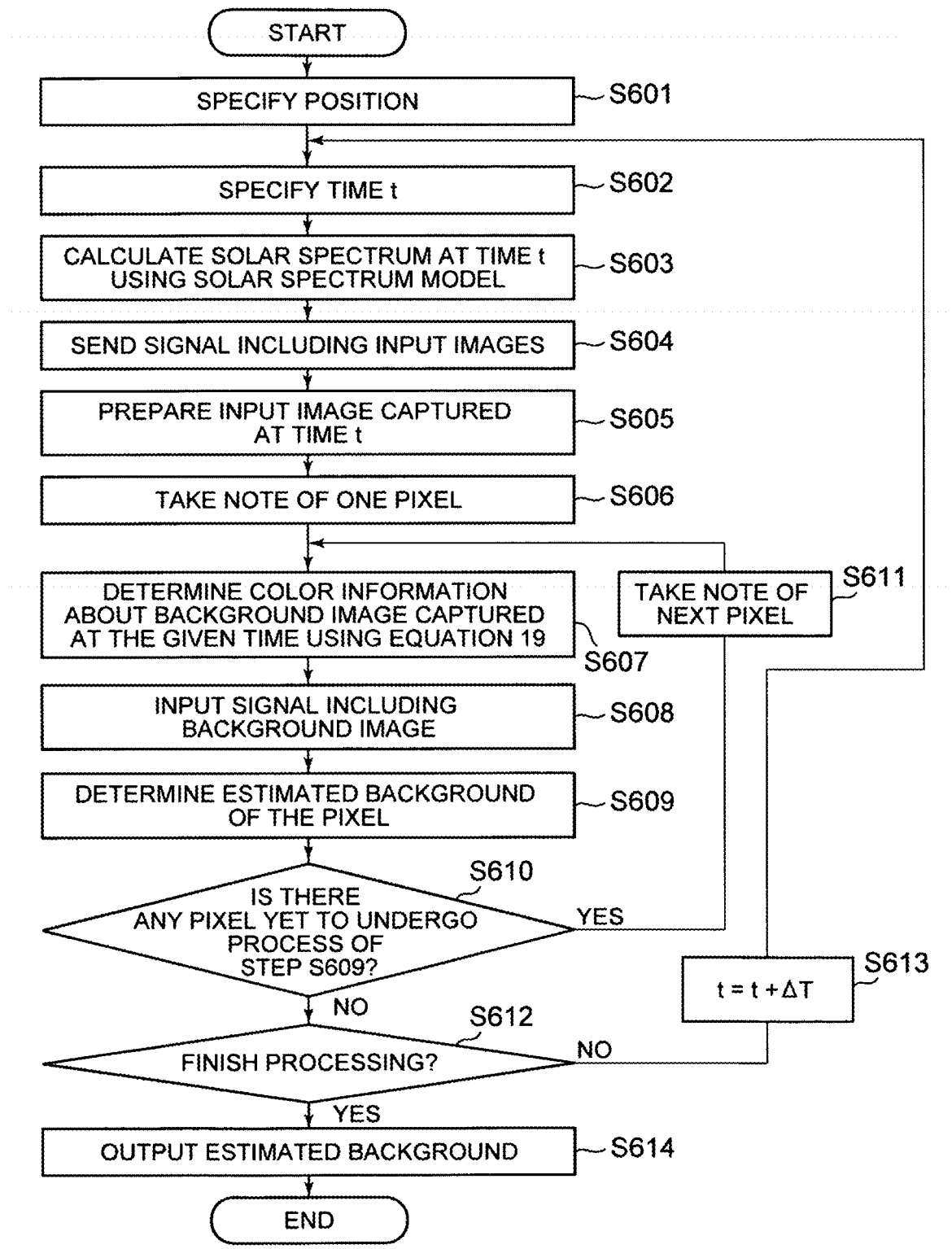
FIG. 13 is a conceptual diagram illustrating a processing of the image processing apparatus according to some aspects.
Figure 14B:
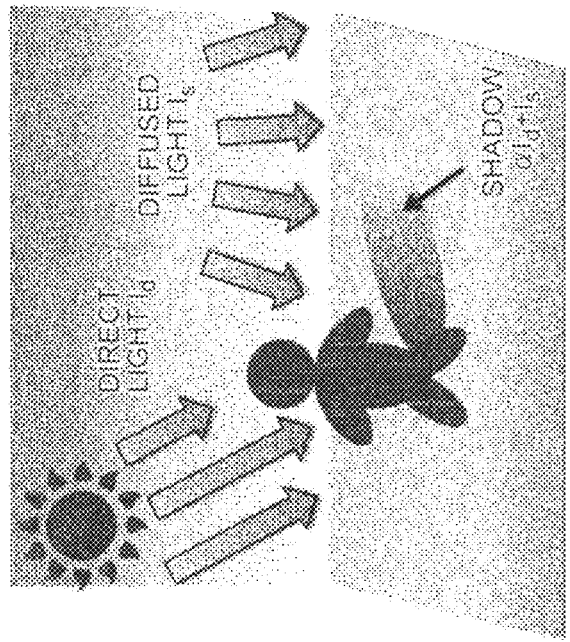
FIG. 14B is an explanatory diagram of lighting components in a background and shadow area in a dichroic lighting environment.
Figure 14A:
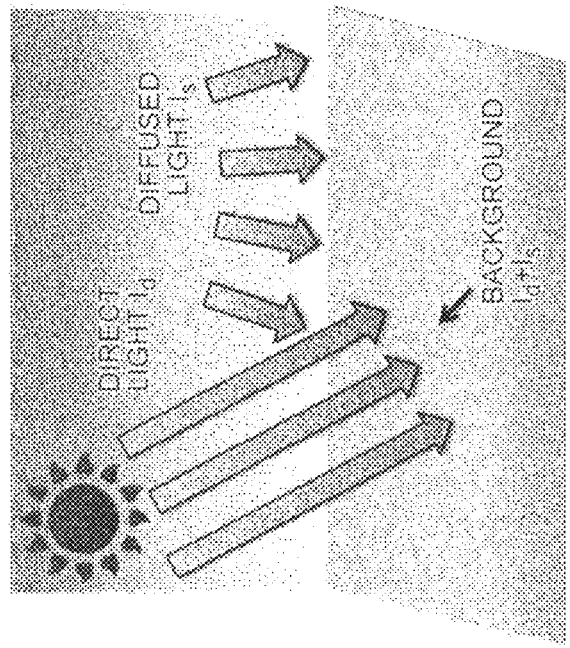
FIG. 14A is an explanatory diagram of lighting components in a background and shadow area in a dichroic lighting environment.
Figure 15:
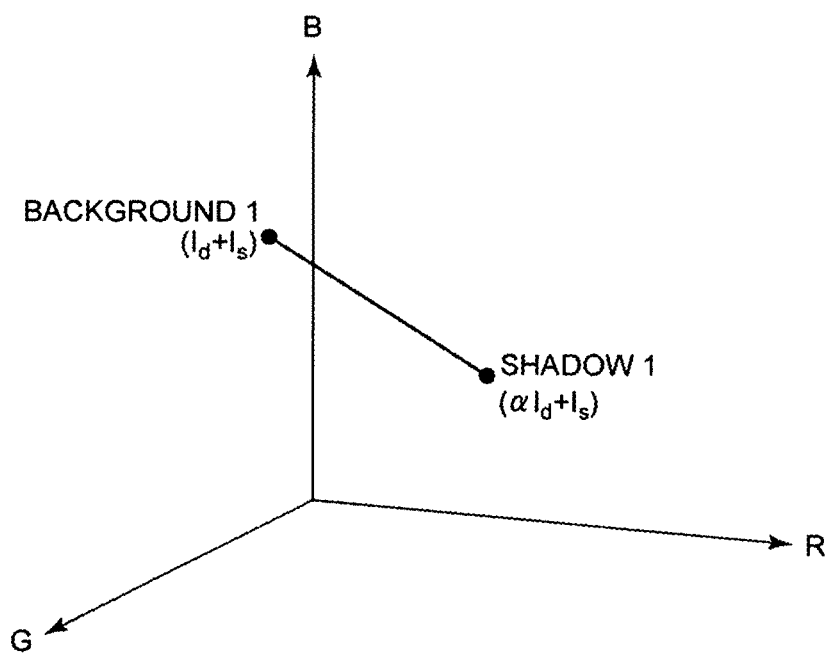
FIG. 15 is an explanatory diagram of lighting components acting on color information in a shadow-free state and shadowed state.
Figure 16:
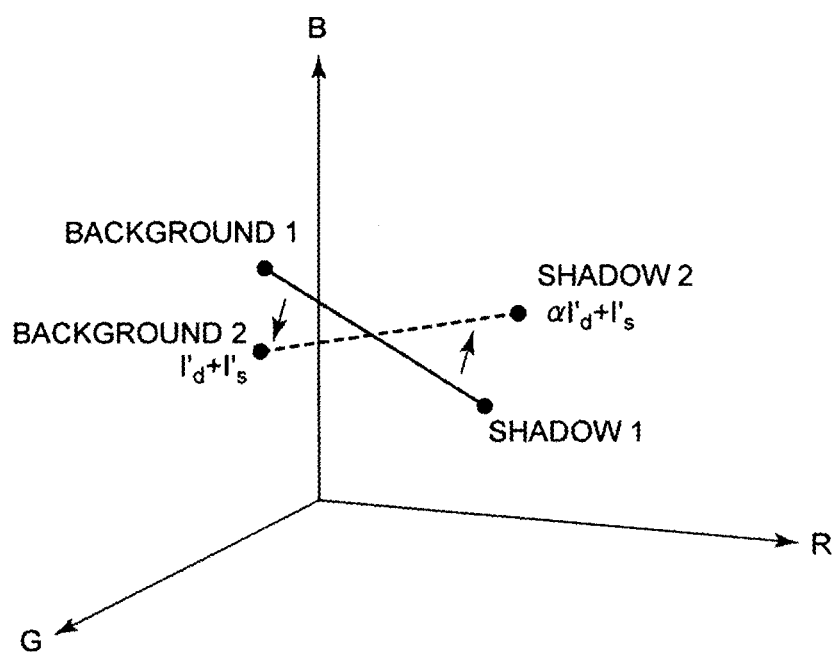
FIG. 16 is an explanatory diagram of a case in which color information about direct light and diffused light differs from that existing during learning.
Figure 17:
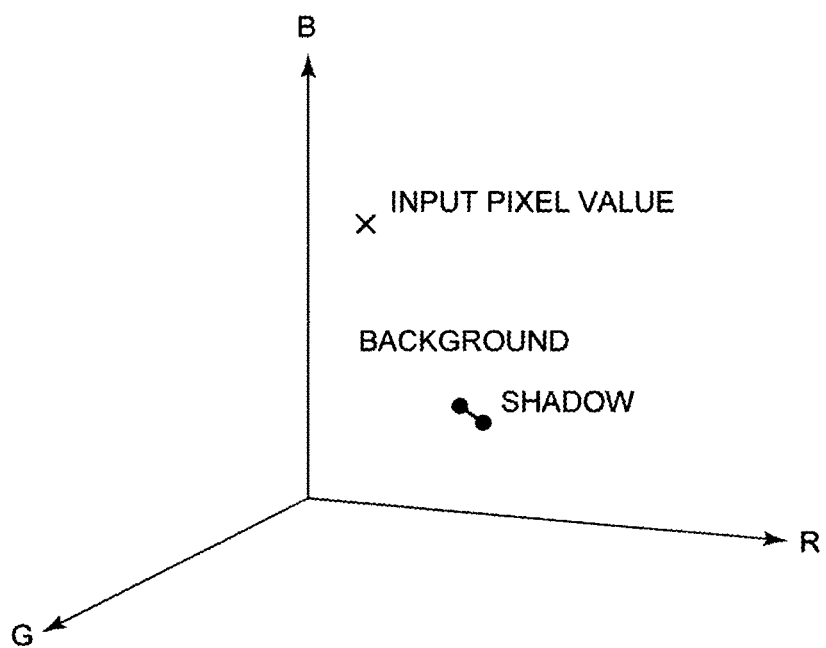
FIG. 17 is an explanatory diagram of a relationship between background and shadow based on erroneous learning data.

FIG. 13 is a conceptual diagram illustrating an example of a processing of the image processing apparatus 13.

In step S601, the position specification unit 136 may specify the position used by the solar spectrum calculation unit 166 to calculate the solar spectrum. In some aspects, the position specification unit 136 may send the specified position to the solar spectrum calculation unit 166 as a signal for use in subsequent processing.

In step S602, the date/time specification unit 126 may specify the date and time t used by the solar spectrum calculation unit 166 to calculate a solar spectrum. An initial value of the date and time t may be T. In some aspects, the date/time specification unit 126 may send a signal including the specified date and time to the solar spectrum calculation unit 166 as a signal for use in subsequent processing.

In step S603, based on the date and time sent from the date/time specification unit 126 and the position sent from the position specification unit 136, the solar spectrum calculation unit 166 may calculate the solar spectrum by a method using a sunlight model. A signal including the calculated solar spectrum may be sent to the estimated-background calculation unit 186.

In step S604, it is assumed that at and after time T−ΔT, the input image input unit 176 accepts input of plural input signals obtained through image capturing at intervals of ΔT, where T may be any time during an image capturing period of input images and ΔT is any time duration. ΔT may not be constant and may be a value which varies depending on the time. It is assumed that an input image is captured at time T±ΔT. The input image input unit 176 may send each of the input image signals to the background image generating unit 156.

In step S605, the background image generating unit 156 may select and output the input image captured at time t and sent from the input image input unit.

In step S606, the background image generating unit 156 may take note of one pixel in the input image.

In step S607, the background image generating unit 156 may determine color information B(T) about the background image at the pixel position of the one pixel taken note of in step S606, using Equation (19) below.

$$B(t)=(1-\alpha)B(t-\Delta T)+\alpha C(T) \qquad (19)$$

where C(T) may be color information about the input image at the pixel position of the one pixel, and α may be a positive parameter which is smaller than 1 and determines a weight of the input image.

The input image C(T) at the predetermined time may be set as an initial value B(T) of B(t). In some aspects, an input image C(T−T') captured in the same image capturing range at any time (T−T') which is earlier than time T and at which the lighting environment is known to have been less changeable than at time T may be used as B(T). The determined color information may be sent to the background image input unit 116.

In step S608, the background image input unit 116 may input, to the estimated-background calculation unit 186, color information about the one pixel retrieved from the background image generating unit 156.

In step S609, based on the solar spectrum sent from the solar spectrum calculation unit 166, color information about one pixel in interest in the background image, and color information about a pixel, which corresponds to the above-described one pixel in interest, of the input image, the estimated-background calculation unit 186 may calculate an estimated background related to the pixel. The estimated background calculated as described above may be sent to the estimated-background output unit 196.

In step S610, the image processing apparatus 13 may determine whether the input image captured at time t includes any pixel yet to undergo the process of step S609.

If the image processing apparatus 13 determines that there is a pixel yet to undergo the process of step S609 ("Yes" in step S610), the processing of the image processing apparatus 13 may proceed to step S611.

If the image processing apparatus 13 may determine that there is no pixel yet to undergo the process of step S609 ("No" in step S610), the processing of the image processing apparatus 13 may proceed to step S612.

In step S611, in the input image captured at time t, the background image generating unit 156 may take note of a next pixel yet to undergo the process of step S609.

Then, the processing of the image processing apparatus 13 may proceed to step S607.

In step S612, the image processing apparatus 13 may determine whether to finish the processing. A condition for determining the processing to be finished may be freely set. Regarding the finishing condition, the processing may be finished based on an external finish command or the processing may be set to be finished after a lapse of a certain time period from time T in advance. In some aspects, the condition for finishing the processing may be a lapse of a predetermined time period from the time the foreground in the input image moves out and disappears from the input image.

If the image processing apparatus 13 does not determine that the processing is to be finished ("No" in step S612), the processing of the image processing apparatus 13 may proceed to step S613.

If the image processing apparatus 13 determines that the processing is to be finished ("Yes" in step S612), in step S614, the estimated-background output unit 196 may output a signal $V_{out}$ including the estimated background sent from the estimated-background calculation unit 186. Then, the processing of the image processing apparatus 13 may be finished.

In step S613, t+ΔT may be substituted into time t.

Then, the processing of the image processing apparatus 13 may proceed to step S602.

In some aspects, the foreground in the input image may move in a relatively short time, and disappear from the input image. This may be typically the case when the foreground is a movable object such as a person, animal, or automobile. In such a case, the background may be extracted from the input image by repeating the processes in the above-described processing even if the image set as B(T) includes a foreground other than the background.

The background image determined as described above may be provided as a background image for use on the image processing apparatus in some aspects. For example, the background image may be used as the background image $V_{bin}$ input in the background image input unit 112 on the image processing apparatus 12 illustrated in FIG. 3 or image processing apparatus 14 illustrated in FIG. 8.

In some aspects, the estimated background related to a pixel and determined by the image processing apparatus may be used as an estimated background on the image processing apparatus. For example, the estimated background may be used for an estimated background image input in the assessment unit 322 on the image processing apparatus 12 illustrated in FIG. 3 or image processing apparatus 14 illustrated in FIG. 8.

[Advantages]

In some aspects, the background image and estimated background image determined by the image processing apparatus can be used for an estimated background image on the image processing apparatus.

In some aspects, the image processing apparatus may provide the advantage of achieving the advantageous effects described above even if a background image is not prepared separately from an input image and input to the image processing apparatus.

Although the present disclosure has been described using some aspects, the present disclosure is not necessarily limited to the aspects, and can be embodied in various modified aspects without departing from the technical idea of the present disclosure.

Aspects of the above-described disclosure may be implemented by a combination of computer hardware and/or software components. For example, some or all of the units discussed above may be standalone computer hardware devices (e.g., logic gates) configured to carry out the above-described processes. Alternatively or additionally, some or all of the units may comprise one or more memories (e.g., computer-readable storage media) storing computer program instructions and one or more processors configured to execute the stored computer program instructions to carry out the disclosed functions.

What is claimed is:

1. An image processing apparatus comprising:
a memory storing instructions; and
at least one processor configured to process the instructions to:
calculate a solar spectrum using a time at which an input image is captured, and a position at which the input image is captured,
calculate an estimated background calculated to be close to a background included in the input image, using the input image and the solar spectrum, and
output the estimated background.

2. The image processing apparatus according to claim 1, wherein the input image includes a plurality of input images that have different image capturing time.

3. The image processing apparatus according to claim 1, wherein the at least one processor is further configured to process the instructions to:
calculate the solar spectrum using a time at which the input image and a background image are captured and a position at which the input image and the background image are captured, and
calculate the estimated background using the input image, the background image, and the solar spectrum.

4. The image processing apparatus according to claim 3, wherein the background image is derived from the plurality of input images.

5. The image processing apparatus according to claim 1, wherein the estimated background is calculated for each of pixels making up the input image.

6. The image processing apparatus according to claim 1, wherein the at least one processor is further configured to process the instructions to:
assess likelihood that a portion included in the input image belongs to a foreground, based on the input image and the estimated background, and
output a result of the assessment.

7. The image processing apparatus according to claim 6, wherein the result of the assessment is calculated for each of the pixels making up the input image.

8. The image processing apparatus according to claim 6, wherein the result of the assessment includes information obtained from a difference between a value of the input image and a value of an estimated background image, where the values are obtained by standardizing color information of a certain color in the input image on a sum of color information of individual colors.

9. The image processing apparatus according to claim 8, wherein the result of the assessment includes information determined from likelihood obtained using the information obtained from the difference and a likelihood function.

10. The image processing apparatus according to claim 6, wherein the at least one processor is further configured to process the instructions to:
specify a condition for determining the result of the assessment,
determine the result of the assessment according to the condition,
output the input image as a foreground image, in relation to a portion in the input image which meets the condition, and
output the foreground image.

11. The image processing apparatus according to claim 10, wherein the determining is made for each of the pixels making up the input image.

12. The image processing apparatus according to claim 11, wherein the at least one processor is further configured to process the instructions to:
take note of one pixel,
calculate the estimated background of the pixel,
assess the pixel, and
extract the foreground of the pixel.

13. An image processing apparatus comprising:
a memory storing instructions; and
at least one processor configured to process the instructions to:
calculate a solar spectrum using a time at which an input image is captured, and a position at which the input image is captured,
calculate an estimated background calculated to be close to a background included in the input image, using the input image, a background image calculated from the input image, and the solar spectrum, and
output the estimated background.

14. The image processing apparatus according to claim 13, wherein the background image is calculated from input images captured at a plurality of times.

15. An image processing method, comprising:
calculating a solar spectrum using a time at which an input image and a background image are captured, and a position at which the input image and the background image are captured;
calculating an estimated background calculated to be close to a background included in the input image, using the input image, the background image, and the solar spectrum; and
outputting the estimated background.

* * * * *